United States Patent
Sato et al.

(10) Patent No.: US 7,920,232 B2
(45) Date of Patent: Apr. 5, 2011

(54) METHOD OF PRODUCING LIQUID CRYSTAL CELL SUBSTRATE, LIQUID CRYSTAL CELL SUBSTRATE, AND LIQUID CRYSTAL DISPLAY DEVICE

(75) Inventors: Morimasa Sato, Fujinomiya (JP); Ichiro Amimori, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 347 days.

(21) Appl. No.: 12/160,735

(22) PCT Filed: Jan. 18, 2007

(86) PCT No.: PCT/JP2007/050680
§ 371 (c)(1),
(2), (4) Date: Jul. 11, 2008

(87) PCT Pub. No.: WO2007/083694
PCT Pub. Date: Jul. 26, 2007

(65) Prior Publication Data
US 2010/0157212 A1    Jun. 24, 2010

(30) Foreign Application Priority Data
Jan. 19, 2006    (JP) .................................. 2006-010988

(51) Int. Cl.
*G02F 1/1335*    (2006.01)
*H01J 9/00*    (2006.01)
*G03F 7/20*    (2006.01)

(52) U.S. Cl. ............. 349/107; 349/187; 445/58; 430/20

(58) Field of Classification Search .................. 349/107, 349/104, 106, 108, 187, 188, 175; 438/30, 438/20; 445/58; 430/20
See application file for complete search history.

(56) References Cited

U.S. PATENT DOCUMENTS

| | | | |
|---|---|---|---|
| 6,169,590 B1 | 1/2001 | Abileah et al. | |
| 6,861,184 B2 * | 3/2005 | Kawase | 430/7 |
| 6,870,584 B2 * | 3/2005 | Kawase et al. | 349/106 |
| 2003/0001992 A1 * | 1/2003 | Kawase et al. | 349/106 |
| 2005/0142464 A1 | 6/2005 | Moriya | |
| 2010/0157212 A1 * | 6/2010 | Sato et al. | 349/107 |

FOREIGN PATENT DOCUMENTS

CN    1682131 A    10/2005
(Continued)

OTHER PUBLICATIONS

Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2007/050680, Jul. 31, 2008, The International Bureau of WIPO, Geneva, CH.

(Continued)

*Primary Examiner* — Brian M Healy
(74) *Attorney, Agent, or Firm* — Buchanan Ingersoll & Rooney PC

(57) ABSTRACT

Provided is a method of producing a liquid crystal cell substrate comprising forming an image having at least two different hues and having different thickness for the respective hue domains, and forming at least one monoaxial or biaxial optically anisotropic layer having different film thicknesses on the respective hue domains on the image.

15 Claims, 2 Drawing Sheets

(a)

(b)

FOREIGN PATENT DOCUMENTS

| | | |
|---|---|---|
| GB | 2 394 718 A | 5/2004 |
| JP | 2004-037837 A | 2/2004 |
| JP | 2005-024919 A | 1/2005 |
| JP | 2005-221594 A | 8/2005 |
| WO | WO 2004/025338 A1 | 3/2004 |
| WO | WO 2006/026275 A2 | 3/2006 |

OTHER PUBLICATIONS

Form PCT/ISA/210 (International Search Report) dated Apr. 17, 2007.

Form PCT/ISA/237 (Written Opinion of the International Searching Authority) dated Apr. 17, 2007.

* cited by examiner (a)

(b)

(a)

(b)

METHOD OF PRODUCING LIQUID CRYSTAL CELL SUBSTRATE, LIQUID CRYSTAL CELL SUBSTRATE, AND LIQUID CRYSTAL DISPLAY DEVICE

TECHNICAL FIELD

The present invention relates to a liquid crystal cell substrate with an optically anisotropic layer. The present invention relates also to a liquid crystal cell substrate with an optical compensation ability, and a liquid crystal display device using the same.

RELATED ART

CRT (Cathode Ray Tube) had most popularly been used as display devices for OA equipment such as word processor, notebook-sized personal computer and personal computer, mobile terminal and television set. In recent years, liquid crystal display device (LCD) has widely been used in place of CRT, by virtue of its thinness, light weight and small power consumption. The liquid crystal display device comprises a liquid crystal cell and polarizer plates. The polarizer plate is composed of protective films and a polarizer film, and is obtained by dying the polarizer film composed of a polyvinyl alcohol film with iodine, stretching, and being stacked with protective films on both surfaces thereof. For example in transmission-type LCD, the polarizer plates may be attached to both sides of the liquid crystal, and a single or more optical compensation sheets may additionally be disposed. On the other hand in reflection-type LCD, a reflective plate, the liquid crystal cell, a single or more optical compensation sheets, and a polarizer plate are disposed in this order. The liquid crystal cell is composed of liquid crystal molecules, two substrates for confining them, and electrode layers for applying voltage to the liquid crystal molecules. The liquid crystal cell takes part in ON/OFF display based on difference in states of alignment of the liquid crystal molecules, and may be adoptable to both of reflection-type and semi-transmission type, for which display modes of TN (Twisted Nematic), IPS (In-Plane Switching), OCB (Optically Compensatory Bend), VA (Vertically Aligned), ECB (Electrically Controlled Birefringence), STN (Super Twisted Nematic) have been proposed. Color and contrast achieved by the conventional LCDs, however, vary depending on angles of viewing the LCDs. Viewing angle performance of LCD is, therefore, still behind that of CRT.

In order to improve the viewing angle performance, retardation plates (optical compensation sheets) for compensating viewing angle have been adopted. Up to this time, LCDs having excellent contrast-viewing angle characteristics have been proposed using optical compensation sheets having various optical characteristics adapted to the various display modes described in the above. In particular, three modes of OCB, VA and IPS have been accepted for their wide viewing angle modes, achieving all-around wide viewing angle characteristics in terms of contrast, and have already been disseminated as being applied to home-use television sets, which have phased into the era of large-size display exceeding 30 inches.

Large-sized LCD has been suffering from a problem of non-uniformity at corners, characterized by leakage of light at corners of the LCD, because of dimensional variation of the polarizer plate induced by environmental moisture. The non-uniformity at corners may be worsened particularly when the optical compensation sheet is bonded to the polarizer plate directly, or while placing an adhesive layer in between, due to changes in the optical characteristics of the viewing angle compensation layer which tends to cause large dimension-dependent changes in retardation.

Another problem resides in that employing the optical compensation sheet can effectively improve the contrast-viewing angle characteristics while it can improve the color-viewing angle characteristics only to an insufficient degree, which indicates that improvement of the color-viewing angle characteristics of LCD is still left as a critical problem to be solved. The color-viewing angle characteristics of LCD is ascribable to that three representative colors of R, G and B cause different changes in retardation, due to different changes in polarization ascribable to these different values of wavelength. The changes may be optimized by optimizing the wavelength dependence of birefringence of the optically anisotropic material, simply referred to as wavelength dispersion of birefringence, with respect to R, G and B. The LCD at present is still on the way to a satisfactory level of improvement in the color-viewing angle characteristics, because the wavelength dispersion of birefringence of the liquid crystal molecules used for ON/OFF display and wavelength dispersion of birefringence of the optical compensation sheet cannot readily be controlled.

A retardation plate using a modified polycarbonate film has been proposed (Japanese Published Patent Application No. 2004-37837), as the optical compensation sheet controlled in the wavelength dispersion of birefringence for improving the color-viewing angle characteristics. The color-viewing angle characteristics may be improved by using the plate as a λ/4 plate in the reflection-type liquid crystal display device, or as the optical compensation sheet in the VA-mode device. The modified polycarbonate film has, however, not widely been adopted to LCD, not only because the material thereof is expensive, but also because the film tends to cause non-uniformity in the optical characteristics such as bowing, during stretching adopted in the process of producing.

Alternatively, there has been proposed also a system of achieving independent compensation for R, G and B (GB2394718), standing on the same principle with the contrast-viewing angle compensation using the optical compensation sheet. This may be realized typically by patterning an optically anisotropic layer in the liquid crystal cell, together with the color filter and so forth. However, formation of the optically anisotropic layer having optically uniform retardation characteristics, in the liquid crystal cell using a patternable material, is not only difficult, but also raises a big problem of increase in the cost ascribable to increase in the number of process steps, because the optically anisotropic layer must be patterned three times for R, G and B, while being aligned with the patterned color filters.

DISCLOSURE OF THE INVENTION

Problems to be Solved by the Invention

It is therefore an object of the present invention to provide a method of producing a liquid crystal cell substrate with an optically anisotropic layer, in a simple and stable manner. It is another object of the present invention to provide a liquid crystal cell substrate contributive to improvement in color-viewing angle characteristics of liquid crystal display device. It is still another object of the present invention to provide a liquid crystal display device having a liquid crystal cell optically compensated in an exact manner, excellent in productivity, and improved in the color-viewing angle characteristics.

Means of Solving the Problems

The means of solving the aforementioned problems are as follows.

[1] A method of producing a liquid crystal cell substrate comprising:
(1) forming an image having at least two different hues and having different thicknesses for the respective hue domains, and
(2) forming at least one monoaxial or biaxial optically anisotropic layer having different film thicknesses on the respective hue domains of the image.

[2] The method of [1], further comprising, following said step (2),
(3) irradiating said optically anisotropic layer with light.

[3] The method of [2], further comprising, following said step (3),
(4) removing a part of said optically anisotropic layer on said substrate.

[4] The method of [1], wherein said step (2) is a step of transferring said optically anisotropic layer onto the image from a transfer material.

[5] The method of [1], wherein said optically anisotropic layer is a layer formed by irradiating a composition comprising a liquid crystalline compound having at least one reactive group with heat or radiation after the composition becomes to show a liquid crystal phase.

[6] The method of [5], wherein said liquid crystal phase of said composition is cholesteric phase.

[7] The method of [5], wherein said radiation is polarized ultraviolet radiation.

[8] The method of any one of [5] to [7], wherein said liquid crystalline compound is a rod-like liquid crystal compound.

[9] The method of any one of [5] to [7], wherein said liquid crystalline compound is a discotic liquid crystal compound.

[10] The method of any one of [5] to [8], wherein said reactive group is an ethylenic unsaturated group.

[11] The method of any one of [1] to [10], wherein said optically anisotropic layer has a value of front retardation (Re) of not 0, and has the same values of retardation measured for light of λ nm coming to the optically anisotropic layer along the direction +40° inclined relative to the normal line direction assuming the in-plane slow axis as the axis of inclination (axis of rotation), and of retardation measured for light of λ nm coming to the optically anisotropic layer along the direction −40° inclined relative to the normal line direction assuming the in-plane slow axis as the axis of inclination (axis of rotation).

[12] The method of any one of [1] to [11], wherein said optically anisotropic layer has a value of front retardation (Re) of 20 to 200 nm, and has a value of retardation, measured for light coming to the optically anisotropic layer along the direction +40° inclined relative to the normal line direction assuming the in-plane slow axis as the axis of inclination (axis of rotation), of 50 to 250 nm.

[13] A liquid crystal cell substrate comprising;
a substrate;
a colored layer, on said substrate, having at least two different hues and having different thicknesses for the respective hue domains; and
at least one monoaxial or biaxial optically anisotropic layer, on said colored layer, having different film thicknesses depending on hues of the respective hue domains thereunder.

[14] The liquid crystal cell substrate of [13], wherein said optically anisotropic layer formed on said colored layer has a horizontal surface.

[15] A liquid crystal cell substrate produced by a method as set forth in any one of [1] to [12].

[16] A liquid crystal display device comprising a liquid crystal cell comprising a pair of substrates, and a liquid crystal layer held between said pair of substrates, wherein one of said pair of substrates is the liquid crystal cell substrate as set forth in [14] or [15].

[17] The liquid crystal display device of [16], employing any one of TN mode, VA mode and IPS mode.

Effect of the Invention

According to the invention, it is possible to produce a liquid crystal cell substrate with an optically anisotropic layer in a simple and stable manner. According to the method of the invention, it is possible to compensate a liquid crystal cell for each color optically without increasing the number of the steps for producing liquid crystal display devices. According to the invention, it is possible to provide a liquid crystal cell substrate contributive to improvement in color-viewing angle characteristics of liquid crystal display device. And according to the invention, it is still possible to provide a liquid crystal display device having a liquid crystal cell optically compensated in an exact manner, excellent in productivity, and improved in the color-viewing angle characteristics.

EMBODIMENTS OF THE INVENTION

The present invention will be detailed below.

It is to be noted that all expressions of ranges using "to" in this specification will be used to express ranges including the numerals placed therebefore and thereafter as the upper and lower limit values, respectively.

In this specification, Re(λ) represents in-plane retardation at wavelength λ. Re(λ) is measured by the parallel Nicol method, for light of λ nm coming to a film along the direction of normal line of the film. In this specification, the "front retardation Re" indicates retardation Re for light coming along the direction of normal line. Values of wavelength λ in this specification are 611±5 nm, 545±5 nm and 435±5 nm for R, G and B, respectively, but the value is 545±5 nm or 590±5 nm if the color is not specifically noted.

In the present invention, numerals expressing angles, and terms "horizontal", "vertical" and "normal" allow tolerance of strict angle±5°. The allowable error to strict angle may preferably be smaller than 4°, and more preferably smaller than 3°. Values of retardation are defined as allowing tolerance of strict retardation value±5%. "Re is not 0" means that "absolute value of Re is 5 nm or larger", and "Re values are equal" means that "difference of values of Re therebetween is 5 nm or smaller". Wavelength at which refractive index is measured is an arbitrary wavelength in the visible light region, unless otherwise noted. The "visible light" in this specification means light ranging from 400 to 700 nm.

The present invention will be detailed below.

[Method of Producing Liquid Crystal Cell Substrate]

A method of producing a liquid crystal cell substrate of the present invention will be explained. First, on a substrate, an image, having at least two different hues and having different thicknesses for the respective hue domains, is formed. For example, an RGB (red/green/blue) color filter pattern may be formed on the substrate as an image. When an RGB color filter pattern is formed on the substrate as an image, the pattern is formed so that thicknesses of the colored domains (RGB domains) are different among them. In other words, the RGB color filter pattern is formed so that a layer R, a layer G and a layer B therein have a different thickness from each other.

The substrate used herein is a transparent substrate, examples of which include publicly-known glass plates such as soda glass plate having a silicon oxide film formed on the surface thereof, low-expansion glass, non-alkali glass, quartz glass plate and so forth, and plastic film and so forth. The substrate maybe such as having an unpatterned optically anisotropic layer, black matrix or the like, formed on the surface thereof. The substrate may be improved in adhesiveness with the optically anisotropic layer, while being preliminarily subjected to coupling treatment. A method disclosed in Japanese Published Patent Application No. 2000-39033 may preferably be adopted as the coupling treatment.

Although not specifically limited, it is generally preferable to adjust thickness of the substrate to 700 to 1200 µm.

Various known methods such as coating, printing, film transfer and so forth may be adoptable as the methods of forming the image on the surface of the substrate. More specifically, the image may be formed by the methods described below.

Coating Manner:

Coating liquid containing a photosensitive resin composition (negative type or positive type) is spread over the substrate (using various systems including spin coater, slit coater, gravure coater and curtain coater), dried, and then subjected to exposure and development according to an arbitrary pattern, to thereby form a necessary image on the substrate. The image is then annealed, if necessary, so as to thoroughly cure. Alternatively, the photosensitive resin composition may be added with a pigment, dye and so forth, so as to form a colored image. Still alternatively, the above-described processes may be repeated twice or more number of times, so as to form an image having a plurality of properties on the substrate. The image formed in this way may have different thicknesses for the respective colored domains, by adjusting concentration of the coating liquid and thickness of coating.

Printing Manner:

Any known printing techniques may be adoptable. The image may be formed on the substrate according to any known method such as intaglio printing, letterpress printing, screen printing and planographic printing. The image is then annealed, if necessary, so as to thoroughly cure. Alternatively, a printing ink composition may be added with a pigment, dye and so forth, so as to form a colored image. Still alternatively, the above-described processes may be repeated twice or more number of times, so as to form an image having a plurality of properties on the substrate. The image formed in this way may have different thicknesses for the respective colored domains, by adjusting concentration of the ink and printing plate.

Ink Jet Manner:

The image may be formed onto the substrate by jetting an ink composition from any jet head. The image is then annealed, if necessary, so as to thoroughly cure. Alternatively, an ink composition may be added with a pigment, dye and so forth, so as to form a colored image. Still alternatively, the above-described processes may be repeated twice or more number of times, so as to form an image having a plurality of properties on the substrate. The image formed in this way may have different thicknesses for the respective colored domains, by adjusting concentration of the ink and amount of jet of ink.

Film Transfer Manner:

Using a photosensitive transfer sheet comprising a support and a photosensitive resin composition coated thereon, a photosensitive resin layer is transferred onto the substrate, and the layer is then subjected to exposure with an arbitrary pattern and development, to thereby form a necessary image on the substrate. The image is then annealed, if necessary, so as to thoroughly cure. Alternatively, the photosensitive resin composition may be added with a pigment, dye and so forth, so as to form a colored image. Still alternatively, the above-described processes may be repeated twice or more number of times, so as to form an image having a plurality of properties on the substrate. Another possible method may be such as transferring the image, preliminarily formed according to the above-described processes, onto the substrate. The image formed in this way may have different thicknesses for the respective colored domains, by adjusting thickness of the preliminarily formed photosensitive resin layer.

For producing a color filter, it is preferable in terms of cost reduction to form a base by stacking the colored resin compositions for forming color filter, form thereon transparent electrodes, and then form spacers, if necessary, by stacking projections for multi-domain alignment, as described in Japanese Published Patent Application No. Hei 11-248921 and Japanese Patent Publication No. 3255107.

Next, at least one monoaxial or biaxial optically anisotropic layer, having different thicknesses on the respective domains of the image, is formed. For an exemplary case where the optically anisotropic layer is formed on the RGB color filter image, the optically anisotropic layer is formed so that the thickness of a region thereof is different from each other depending on the hue (R, G or B) of the colored domain disposed under the region. For example, a color filter with layers R, G and B of which thicknesses are $d_R$, $d_G$ and $d_B$ respectively, satisfying the relation of $d_R > d_G > d_B$, is formed; and the optically anisotropic layer is formed on the color filter. In such a case, the optically anisotropic with regions r, g and b, which are regions disposed on the layers R, G and B respectively, is formed so that the thickness of the optically anisotropic layer is different among the regions r, g and b. Assuming now that thickness of the domains r, g and b as $d_r$, $d_g$ and $d_b$, respectively, that the relation of $d_r < d_g < d_b$ holds, and that values of $d_R+d_r$, $d_G+d_g$ and $d_B+d_b$ are nearly equal, the optically anisotropic layer may have a horizontal surface as a whole, and may preferably be used as a liquid crystal cell substrate, because handling property typically in the later processes of forming other layers (transparent electrode film layer and alignment layer for liquid crystal layer) may be improved.

Methods of forming the optically anisotropic layer are not specifically limited, wherein formation by using a transfer material having the optically anisotropic layer formed thereon may be preferable, because the above-described condition may be satisfied, and also because the optically anisotropic layer having the surface horizontal as a whole may be formed in a simple and stable manner. For example, a transfer material, having an optically anisotropic layer formed on a temporary support, is placed on the surface of the image formed on the substrate, so as to bring the surface of the optically anisotropic layer into contact therewith, pressed using a laminator or the like, under heating if necessary, the temporary support is then removed, to thereby transfer the optically anisotropic layer onto the image. If the optically anisotropic layer has a certain degree of flexibility, thickness of the optically anisotropic layer may be adjustable depending on difference in thickness of the image. More specifically, the regions of the optically anisotropic layer disposed on the thicker colored domains may have smaller thickness, whereas the regions of the optically anisotropic layer disposed on the thinner colored domains may have larger thickness, making the surface of the optically anisotropic layer kept horizontal as a whole. The regions r, g and b of the optically anisotropic layer, having different thickness, preferably have retardation characteristics individually optimized for the individual hues of the correspondent layers R, G and B. Retardation is one of the retardation characteristics, magnitude of which is proportional to the thickness of layer under the same birefringence $\Delta n$. Because the layer R needs only smaller retardation for optical compensation as compared with the layers G and B, the layer R is made thicker in the process of forming the image, and the domain r disposed thereon is consequently made thinner. In contrast, because the layer B needs larger retardation for optical compensation as compared with the layers R and G, the layer B is made thinner in the process of forming the image, and the domain b disposed thereon is consequently made thicker. The layer G is made to an intermediate thickness, so that also the domain g is made to an intermediate thickness. As a consequence, the optically anisotropic layer having retardation characteristics optimized for optical compensation for each of RGB may be formed.

Methods of transferring the layer onto the substrate using the transfer material are not specifically limited, allowing any methods so far as the optically anisotropic layer can be transferred onto the substrate. For example, a film-like transfer material comprising the temporary support and the optically anisotropic layer may be disposed on the substrate while making the surface of the optically anisotropic layer facing to the top surface of the substrate, using a laminator, with the aid of rollers or flat plate under heating and/or pressurizing, so as to effect cladding or heat cladding. Specific examples of the laminator and method of laminating include those described in Japanese Published Patent Application Nos. Hei 7-110575, Hei 11-77942, 2000-334836 and 2002-148794, wherein the method described in Japanese Published Patent Application No. Hei 7-110575 is preferably used in view of reducing contamination with foreign matters. Also a vacuum laminator is useful in view of suppressing entrainment of bubbles in the process of transfer. The temporary support may be separated thereafter, wherein the surface of the optically anisotropic layer exposed after the separation may have other layers, such as electrode layers, formed thereon.

The method may comprise an additional step of removing a part of optically anisotropic layer formed on the image. For example, the portion of the optically anisotropic layer transferred onto the periphery of the substrate may be removed if unnecessary. In another case where the optically anisotropic layer is formed on the color filter image, it may be good enough for the optically anisotropic layer to be stacked only on the individual colored layers of RGB, while being unneeded in other portions, so that the optically anisotropic layer may be removed from the portion other than the portion above the RGB layers. For an exemplary case where the optically anisotropic layer has photosensitivity, a part of the optically anisotropic layer may be removed by photolithography after being transferred. More specifically, the optically anisotropic layer is exposed according to a pattern same as that of the color filter image, so as to induce difference in solubility to a developing solution between the exposed portion and the non-exposed portion, a part of the optically anisotropic layer is then removed by developing and so forth, to thereby leave the optically anisotropic layer only on the colored layer. Exposure according to a pattern may be carried out from above and through a predetermined mask placed over a photosensitive resin layer formed on the transferred material, or may be carried out using laser light or electron beam, while being focused on predetermined positions without using the mask. Alternatively, so-called self alignment system may be adoptable, allowing removal of only portions fallen behind the black matrix by back exposure from the substrate side. Light sources adoptable to the exposure may appropriately be selectable from those capable of irradiating light in the wavelength region (365 nm or 405 nm, for example) causative of curing of the optically anisotropic layer. Specific examples thereof may be exemplified by ultra-high-pressure mercury lamp, high-pressure mercury lamp, metal halide lamp and so forth. Energy of exposure generally ranges from 5 to 200 mJ/cm$^2$ or around, and preferably from 10 to 100 mJ/cm$^2$ or around.

The exposure may be followed by development. Developing solution used for the development is not specifically limited, wherein any known developing solution such as described in Japanese Published Patent Application No. Hei 5-72724 may be used. The developing solution is preferably such as allowing therein a resin layer to exhibit dissolving behavior, wherein water-base one preferably contains a compound of pKa=7 to 13 to as much as 0.05 to 5 mol/L, while allowing addition of small amount of organic solvent miscible with water. Examples of the organic solvent miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethylformamide, dimethylacetamide, hexamethylphosphorylamide, ethyl lactate, methyl lactate, $\epsilon$-caprolactam and N-methylpyrrolidone. Concentration of the organic solvent is preferably 0.1% by mass to 80% by mass. The organic solvent alone may be used for the development.

The developing solution may further be added with known surfactant. Concentration of the surfactant is preferably 0.01% by mass to 10% by mass.

Any known methods, including paddle development, shower development, shower-and-spin development and dip development, may be adoptable as a system of the development. Uncured portion may be removed by showering the developing solution on the resin layer after exposure.

Any other layers transferred from the transfer material may remain on the optically anisotropic layer, but they are preferably removed typically in the process of development, cleaning and so forth for patterning, because the liquid crystal cell should be prevented as possible from being contaminated by impurities.

On the surface of the optically anisotropic layer formed on the substrate, a transparent electrode layer composed of ITO or the like, and an alignment layer and so forth may further be formed. The transparent electrode layer may be formed typically by sputtering, and the alignment layer may be formed typically by coating or transfer.

In the above-described method, thickness of the optically anisotropic layer may automatically be varied by varying, hue-by-hue, thickness of the color filter layer formed thereunder, so that the optically anisotropic layer optimized for the individual colors of R, G and B maybe formed on the color filter, without increasing the number of process steps. In particular, the optically anisotropic layer may be formed on the color filter in more simple and more stable manner, by using the transfer material. Accordingly the present invention may improve the color-viewing angle characteristics of the liquid crystal display device, without degrading the productivity.

Details of the transfer material adoptable to the present invention will be described later.

[Liquid Crystal Cell Substrate]

A schematic sectional view of one example of the liquid crystal cell substrate of the present invention, produced according to the above-described method, is shown in FIG. 1(a). The liquid crystal cell substrate shown in FIG. 1(a) comprises a transparent substrate 21 typically composed of a glass plate, a black matrix 22, a colored layer (color filter layer composed of R layer, G layer and B layer) 23 of which thickness is different among the different hues layers, and an optically anisotropic layer 27 formed on the colored layer 23. The optically anisotropic layer 27 is divided into regions r, g and b of which thickness are different from each other depending on the hues (RGB) of the colored layer 23 disposed under the regions. The R layer, G layer and B layer of the colored layer 23 are reduced in the thickness in this order, whereas the optically anisotropic layer 27 is increased in the thickness in the order of the regions r, g and b, and shows retardation characteristics respectively optimized to the hues of the R layer, G layer and B layer. As shown in the drawing, a transparent electrode layer 25 and an alignment layer 26 and so forth may be formed on the optically anisotropic layer 27, and for this purpose, the surface of the optically anisotropic layer 27 is preferably kept horizontal. "Horizontal" herein means that difference in the level of height of surface irregularity per 1000 µm is 0.5 µm or smaller. The difference exceeding 0.5 µm may undesirably increases electric resistivity of the transparent electrodes formed thereon.

FIG. 1(b) shows a schematic sectional view of another example of the liquid crystal cell substrate of the present invention. Any components common with those shown in FIG. 1(a) will be given with the same reference numerals, so as to avoid repetitive explanation. The liquid crystal cell substrate shown in FIG. 1(b) has an optically anisotropic layer 24 between the colored layer 23 and the transparent substrate 21. The optically anisotropic layer 24 is an unpatterned layer, may be formed by a method of using a transfer material, or other method such as coating, wherein materials therefor are not specifically limited. Provision of the optically anisotropic layer 24, as being combined with the optically anisotropic layer 27, allows more exact optical compensation. Similar effect may be obtained if a substrate having an unpatterned optically anisotropic layer, and the liquid crystal cell substrate shown in FIG. 1(a) are used as a pair of opposed substrates. One of the pair of opposed substrates generally has drive electrodes typically in a form of TFT array arranged thereon, wherein the unpatterned optically anisotropic layer may be formed anywhere on the opposed substrate, but may preferably be formed above the silicon layer for the device of the active matrix dynamic type using TFT, taking heat resistance of the optically anisotropic layer into consideration.

FIGS. 1(a) and 1(b) show an embodiment having the color filter composed of R, G and B layers, formed as the colored layer 23, whereas the color filter composed of R, G, B and W (white) layers, becoming popular recently, may be formed.

By using the transfer material, only a single transfer (and exposure and development) process allows formation of the optically anisotropic layer on the multi-color filter as being corresponded to the individual hues at a time, so that the viewing angle characteristics of the liquid crystal display device may be improved by a single time of process.

[Liquid Crystal Display Device]

FIGS. 2(a) and 2(b) show schematic sectional views of examples of the liquid crystal display device of the present invention. In FIGS. 2(a) and 2(b), any components same as those shown in FIGS. 1(a) and 1(b) will be given with the same reference numerals, so as to avoid repetitive explanation. The liquid crystal display device shown in FIG. 2(a) uses a liquid crystal cell 37 having the liquid crystal cell substrate shown in FIG. 1(a) used as the upper substrate, a transparent substrate 21' with TFT (reference numeral 32 in the drawing) used as the opposing substrate, and a liquid crystal 31 held between the substrates. On both sides of the liquid crystal cell 37, there is respectively disposed a polarizer plate 36 having protective films 34 and 35 typically composed of cellulose film, and a polarizer layer 33 held therebetween. The protective film 35 on the liquid crystal cell side may be an optical compensation sheet, or may be same with the protective film 34. The liquid crystal display device shown in FIG. 2(b) has the same configuration with that shown in FIG. 1(b), except that the liquid crystal cell substrate shown in FIG. 1(b) is used as the upper substrate.

Although not shown in the drawing, only a single polarizer plate disposed on the observer's side will suffice in the embodiment of reflection-type liquid crystal display device, wherein a reflective film is provided on the back side of the liquid crystal cell, or on the inner surface of the lower substrate of the liquid crystal cell. Of course, a front light may be provided on the observer's side of the liquid crystal cell. Alternatively, semi-transmission configuration, having a transmissive portion and a reflective portion provided in every pixel, maybe adoptable. The present invention is adoptable all transmission-type and reflection-type liquid crystal display devices, without special limitation on the display mode. Among others, the present invention is particularly effective to the VA-mode ones in need of improvement in the color-viewing angle characteristics.

[Transfer Material]

Next, the transfer material adoptable to the method of producing a liquid crystal cell substrate of the present invention will be explained. One example of the transfer material adoptable to the method of the present invention may be such as having a temporary support and at least one optically anisotropic layer, and may be used for transferring the optically anisotropic layer onto other substrate. FIGS. 3(a) to 3(c) are schematic sectional views of several examples of the transfer material adoptable to the method of producing of the present invention. The transfer material shown in FIG. 3(a) has a transparent or opaque temporary support 11, and an optically anisotropic layer 12 provided thereon. The transfer material may have any other layer such as a layer 13 shown in FIG. 3(b), which functions in the process of forming the optically anisotropic layer 12 as an alignment layer for controlling alignment of the liquid crystalline molecules in the layer, between the support 11 and the optically anisotropic layer 12. Alternatively as shown in FIG. 3(c), a layer 14 may be provided for the purpose of imparting controllability of mechanical characteristics, such as cushion performance, for absorbing irregularity of the target substrate in the process of transfer, or conformability to the irregularity.

Next, the transfer material adoptable to the method of producing a liquid crystal cell substrate of the present invention will be detailed, bringing materials and procedures applied to the manufacture into focus. It is to be understood that the transfer material adoptable to the present invention is not limited to the embodiments described below, instead any other embodiments may be carried out referring to the description below and known methods.

One example of the transfer material adoptable to the method for producing a liquid crystal cell substrate of the present invention comprises a temporary support, and at least one optically anisotropic layer. The optically anisotropic layer preferably has optical characteristics contributive, after being transferred onto the transparent substrate, to optical compensation of the cell of the liquid crystal display device, in other words, contributive to expansion of the contrast-ensuring viewing angle, and to cancellation of coloration of images on the liquid crystal display device. The optically anisotropic layer is, however, not always required to have optical characteristics required for optical compensation before being transferred onto the substrate. For an exemplary case where the layer is to be subjected to exposure of light or the like at the same time with, or after the transferring step, the layer may be such as showing optical characteristics required for optical compensation, as a result of changes or appearance of the optical characteristics induced by the exposure process.

By transferring the optically anisotropic layer from the transfer material onto the image varied in the thickness hue-by-hue, the optically anisotropic layer varied in the thickness, or varied in the optical characteristics, may readily be formed onto the image, and as a consequence, the liquid crystal display device maybe improved in the viewing angle characteristics, in particular color-viewing angle characteristics, substantially without increasing the number of process steps of producing the liquid crystal display device.

[Optically Anisotropic Layer]

The optically anisotropic layer of the transfer material is not specifically limited so far as it has at least one direction showing retardation Re of not 0, in other words, it has non-isotropic optical characteristics. In terms of adoptability for use in the liquid crystal cell, and readiness in controlling the optical characteristics, the optically anisotropic layer is preferably formed by allowing the liquid crystal layer, containing at least one species of liquid crystalline compound, to cure under ultraviolet irradiation.

[Optically Anisotropic Layer Formed of Composition Comprising Liquid Crystalline Compound]

The optically anisotropic layer exhibits its function of compensating viewing angle of the liquid crystal display device, as being incorporated into the liquid crystal cell as described in the above. Not only embodiments in which the optically anisotropic layer, all by itself, can exhibit a sufficient level of optical compensation performance, but also embodiments in which optical characteristics required for optical compensation is satisfied by combination with any other layer (for example, optically anisotropic layer disposed outside the liquid crystal cell), may be included in the scope of the present invention. As described in the above, also it is not always necessary for the optically anisotropic layer of the transfer material to have optical characteristics sufficient for optical compensation performance, instead, for example, the optically anisotropic layer may exhibit or cause changes in the optical characteristics induced by exposure of light carried out in the process of transfer onto the liquid crystal cell substrate, so as to finally exhibit optical characteristics required for optical compensation.

The optically anisotropic layer is preferably formed of a composition comprising at least one type of liquid crystal compound. In general, liquid crystalline compounds can be classified into a rod-shaped type and a disc-shaped type on the basis of the figure thereof. Each type includes a low molecular type and a high molecular type. A high molecule generally indicates a molecule having a polymerization degree of 100 or more (Masao Doi; Polymer Physics.Phase transition Dynamics, page 2 Iwanami Shoten, 1992) In the embodiment, although any types of liquid crystalline compounds can be used, the use of a rod-shaped liquid crystalline compound or a disc-shaped liquid crystalline compound is preferred. A mixture of two types or more of the rod-shaped liquid crystalline compounds, two types or more of the disc-shaped liquid crystalline compounds, or the rod-shaped liquid crystalline compound and disc-shaped liquid crystalline compound may be used. Since it is possible to make the alteration due to temperature and humidity small, a rod-shaped liquid crystalline compound or a disc-shaped liquid crystalline compound having a reactive group is preferably used for the formation. The mixture may further comprise preferably at least one type has two or more reactive groups in one liquid crystal molecule. The liquid crystalline compound may be composed of a mixture of two types or more, and in that case, at least one type preferably has two or more reactive groups. The thickness of the retardation layer is preferably 0.1-20 μm, further preferably 0.5-10 μm.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolane compounds and alkenylcyclohexylbenzonitrile compounds. Not only the low-molecular-weight, liquid-crystalline compound as listed in the above, high-molecular-weight, liquid-crystalline compound may also be used. High-molecular-weight liquid-crystalline compounds maybe obtained by polymerizing low-molecular-weight liquid-crystalline compounds having at least one polymerizable group. Among such low-molecular-weight liquid-crystalline compounds, liquid-crystalline compounds represented by a formula (I) are preferred.

$$Q^1-L^1-A^1-L^3-M-L^4-A^2-L^2-Q^2 \quad \text{Formula (I)}$$

In the formula, $Q^1$ and $Q^2$ respectively represent a reactive group. $L^1$, $L^2$, $L^3$ and $L^4$ respectively represent a single bond or a divalent linking group, and it is preferred that at least one of $L^3$ and $L^4$ represents —O—CO—O—. $A^1$ and $A^2$ respectively represent a $C_{2-20}$ spacer group. M represents a mesogen group.

The rod-like liquid crystal compound, having a reactive group, represented by formula (I), will be further described in detail hereinafter. In formula (I), $Q^1$ and $Q^2$ respectively represent a reactive group. The polymerization reaction of the reactive group is preferably addition polymerization (including ring opening polymerization) or condensation polymerization. In other words, the reactive group is preferably a functional group capable of addition polymerization reaction or condensation polymerization reaction. Examples of polymerizable groups are shown below.

[Formula 1]

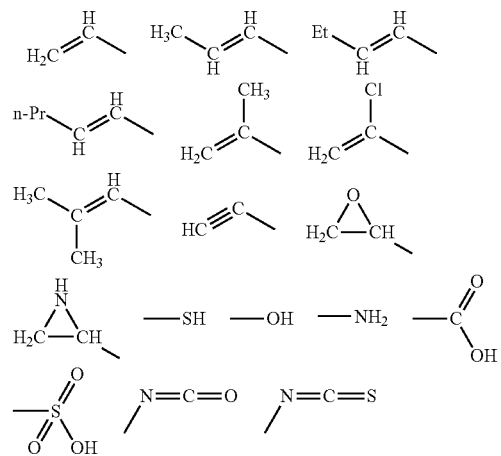

$L^1$, $L^2$, $L^3$ and $L^4$ independently represent a divalent linking group, and preferably represent a divalent linking group selected from the group consisting of —O—, —S—, —CO—, —NR$^2$—, —CO—O—, —O—CO—O—, —CO—NR$^2$—, —NR$^2$—CO—, —O—CO—, —O—CO—NR$^2$—, —NR$^2$—CO—O— and —NR$^2$—CO—NR$^2$—. R$^2$ represents a C$_{1-7}$ alkyl group or a hydrogen atom. It is preferred that at least one of L$^3$ and L$^4$ represents —O— or —O—CO—O— (carbonate group). It is preferred that Q$^1$-L$^1$ and Q$^2$-L$^2$-are respectively CH$_2$=CH—CO—O—, CH$_2$=C(CH$_3$)—CO—O— or CH$_2$=C(Cl)—CO—O—CO—O—; and it is most preferred they are respectively CH$_2$=CH—CO—O—.

In the formula, A$^1$ and A$^2$ preferably represent a C$_{2-20}$ spacer group. It is more preferred that they respectively represent C$_{2-12}$ aliphatic group, and much more preferred that they respectively represent a C$_{2-12}$ alkylene group. The spacer group is preferably selected from chain groups and may contain at least one unadjacent oxygen or sulfur atom. And the spacer group may have at least one substituent such as a halogen atom (fluorine, chlorine or bromine atom), cyano, methyl and ethyl.

Examples of the mesogen represented by M include any known mesogen groups. The mesogen groups represented by a formula (II) are preferred.

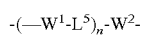  Formula (II)

In the formula, W$^1$ and W$^2$ respectively represent a divalent cyclic aliphatic group, a divalent aromatic group or a divalent hetero-cyclic group; and L$^5$ represents a single bond or a linking group. Examples of the linking group represented by L$^5$ include those exemplified as examples of L$^1$ to L$^4$ in the formula (I) and —CH$_2$—O— and —O—CH$_2$—. In the formula, n is 1, 2 or 3.

Examples of W$^1$ and W$^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. 1,4-cyclohexanediyl has two stereoisomers, cis-trans isomers, and the trans isomer is preferred. W$^1$ and W$^2$ may respectively have at least one substituent. Examples the substituent include a halogen atom such as a fluorine, chlorine, bromine or iodine atom; cyano; a C$_{1-10}$ alkyl group such as methyl, ethyl and propyl; a C$_{1-10}$ alkoxy group such as methoxy and ethoxy; a C$_{1-10}$ acyl group such as formyl and acetyl; a C$_{2-10}$ alkoxycarbonyl group such as methoxy carbonyl and ethoxy carbonyl; a C$_{2-10}$ acyloxy group such as acetyloxy and propionyloxy; nitro, trifluoromethyl and difluoromethyl.

Preferred examples of the basic skeleton of the mesogen group represented by the formula (II) include, but are not to be limited to, these described below. And the examples may have at least one substituent selected from the above.

[Formula 2]

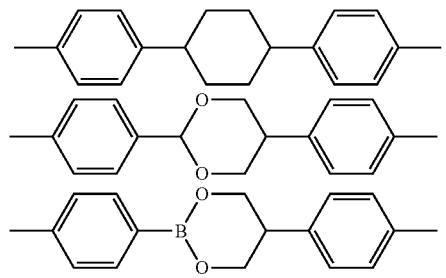

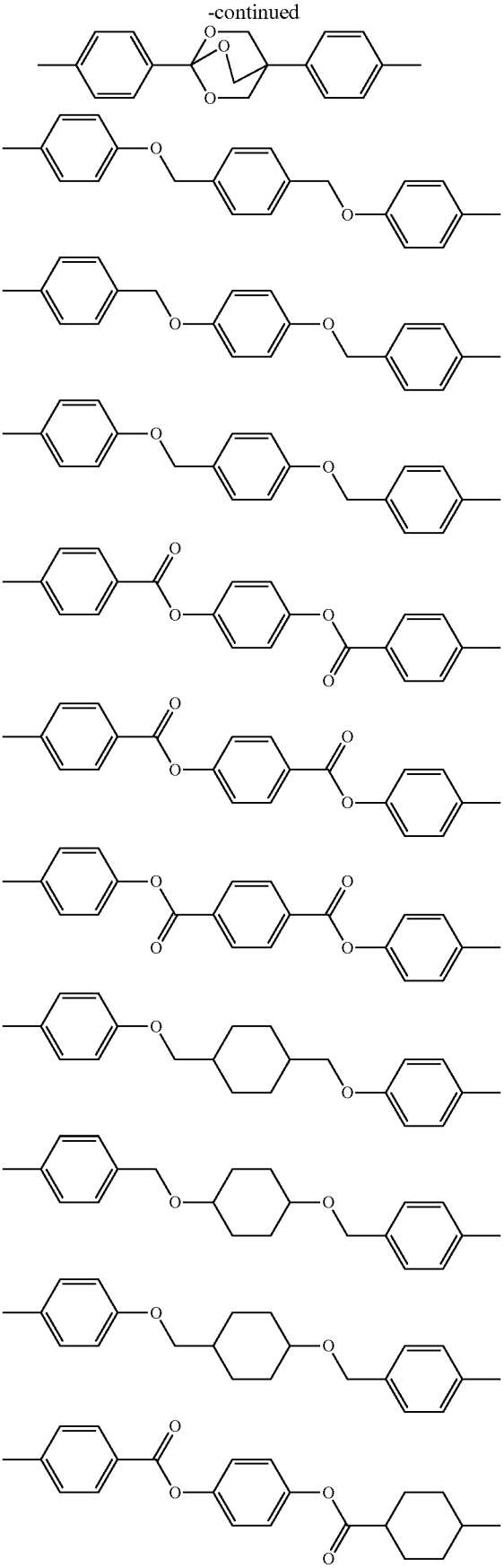

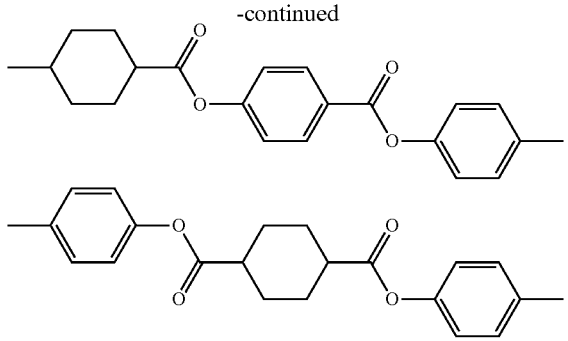
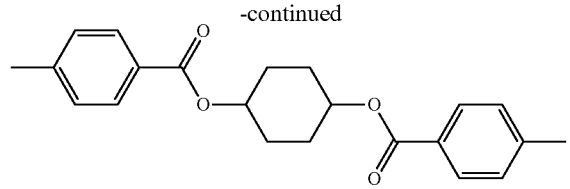
Examples the compound represented by the formula (I) include, but are not to be limited to, these described below. The compounds represented by the formula (I) may be prepared according to a method described in Japanese translation of PCT International Application No. Hei 11-513019.
[Formula 3]
I-1
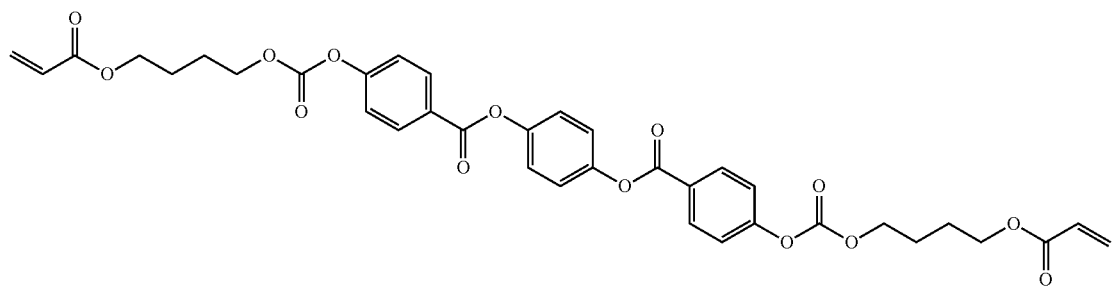
I-2
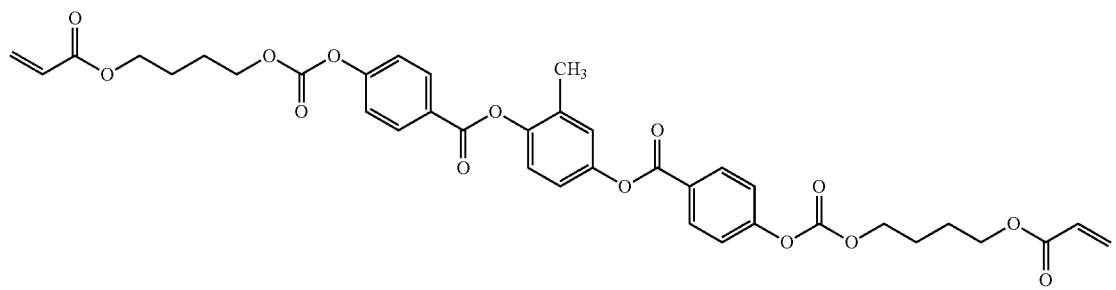
I-3
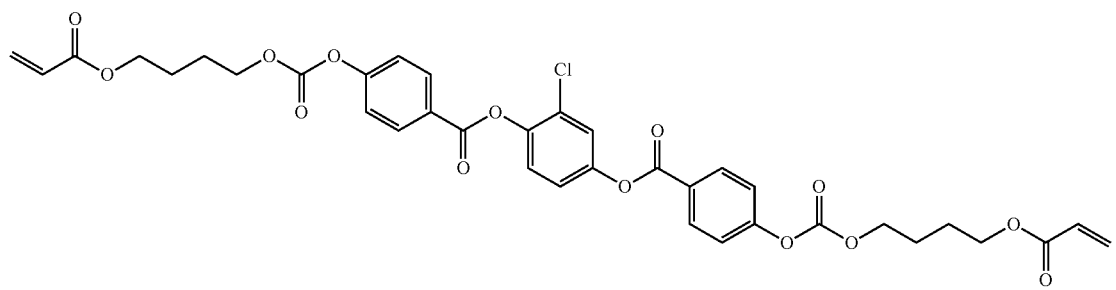
I-4
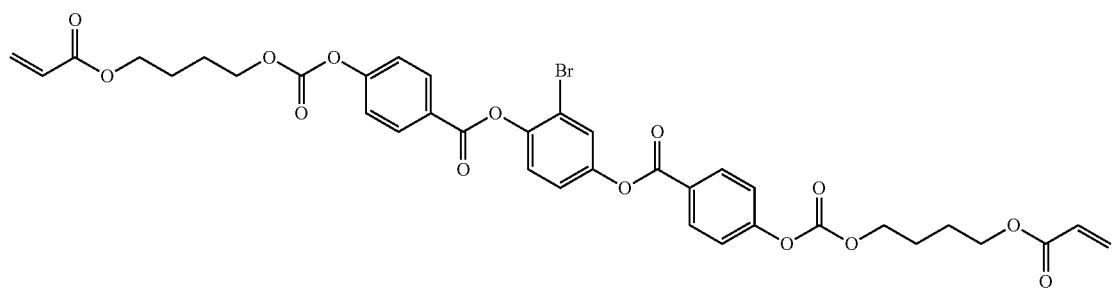

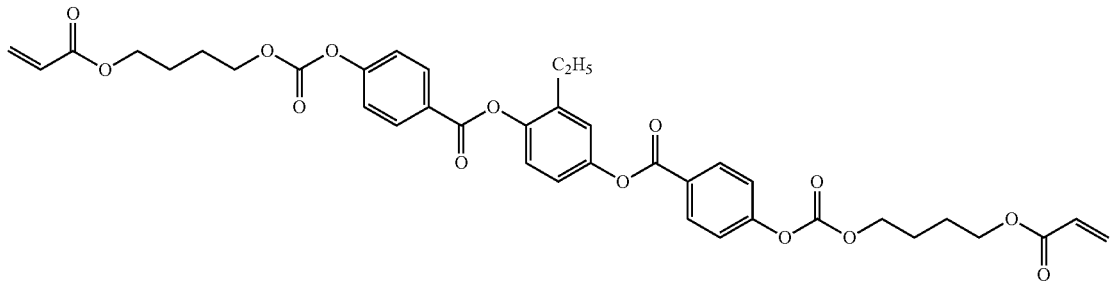
I-5
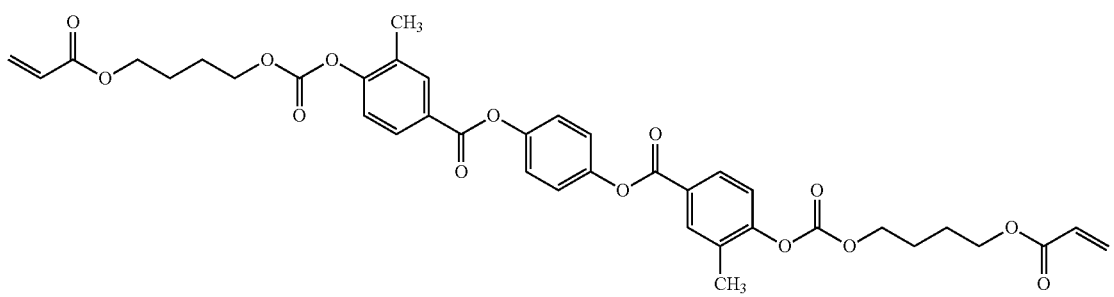
I-6
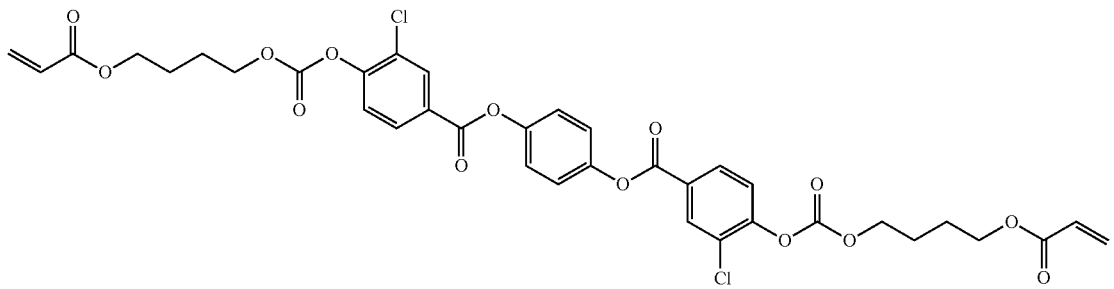
I-7
[Formula 4]
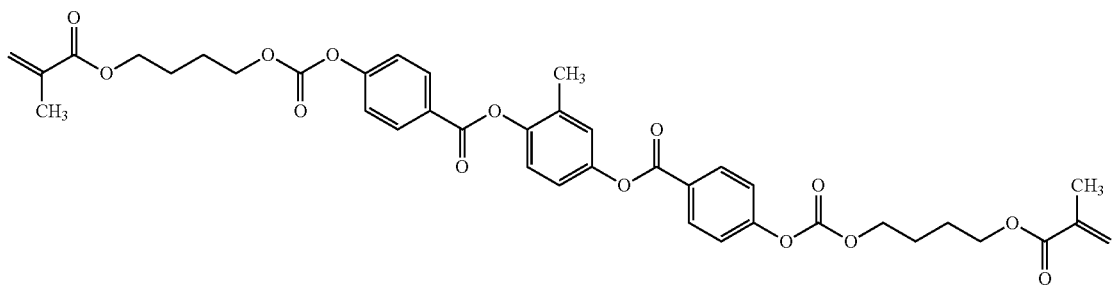
I-8
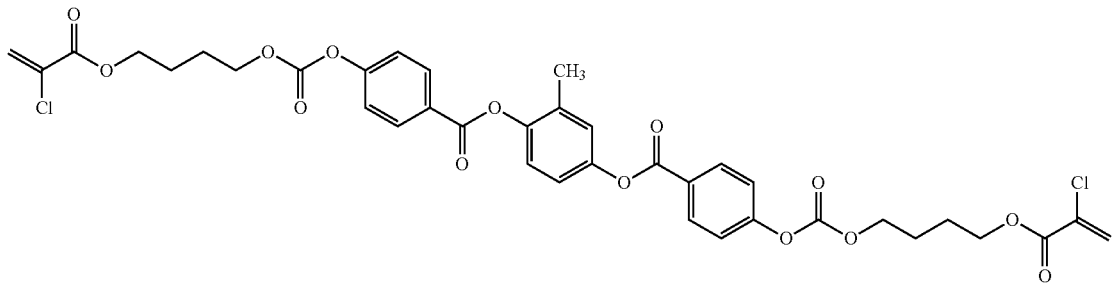
I-9

-continued
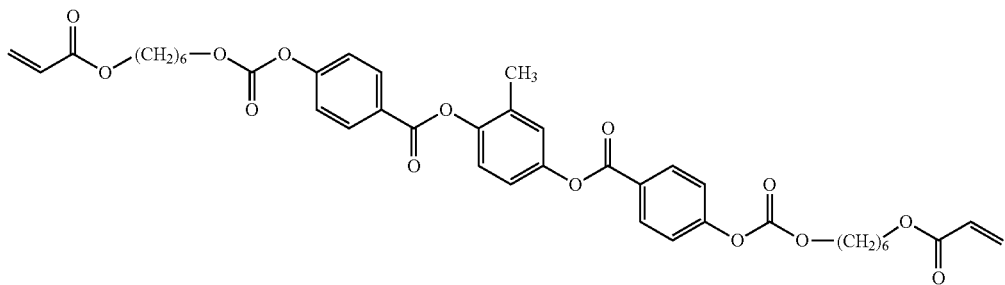
I-10
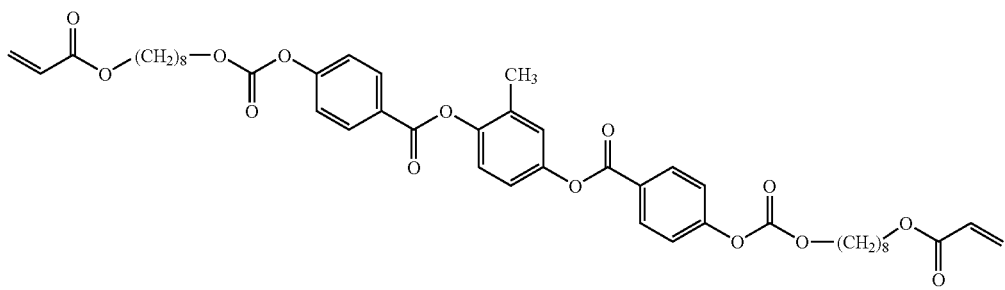
I-11
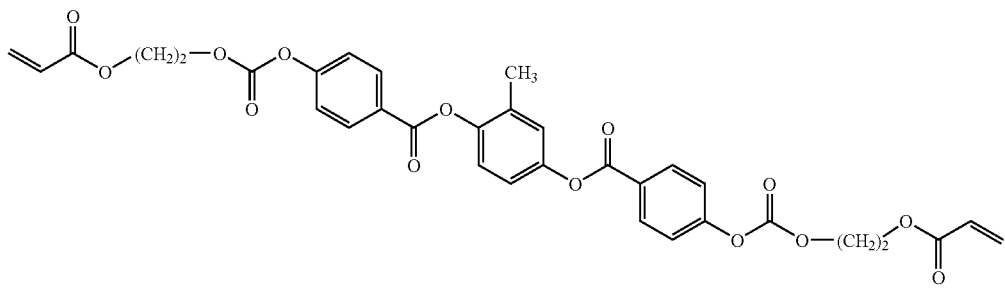
I-12
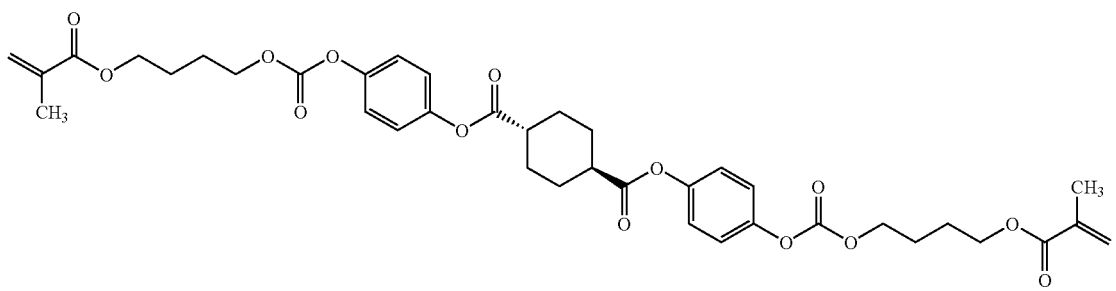
I-13
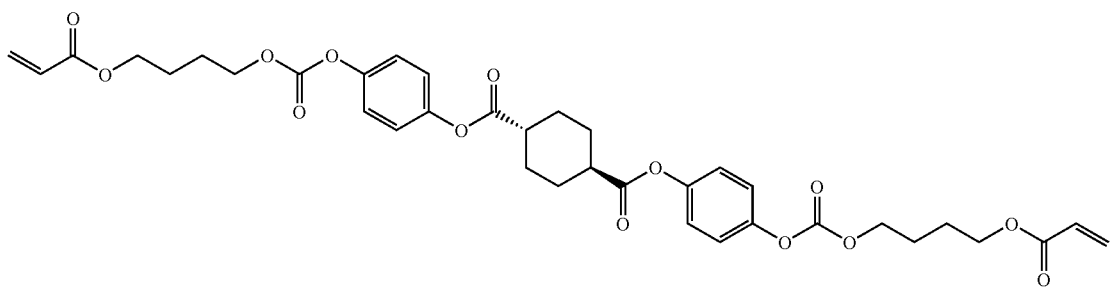
I-14

I-15
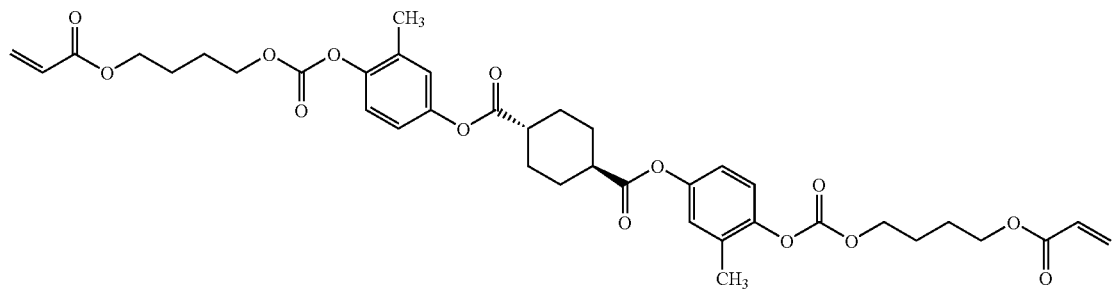
[Formula 5]
I-16
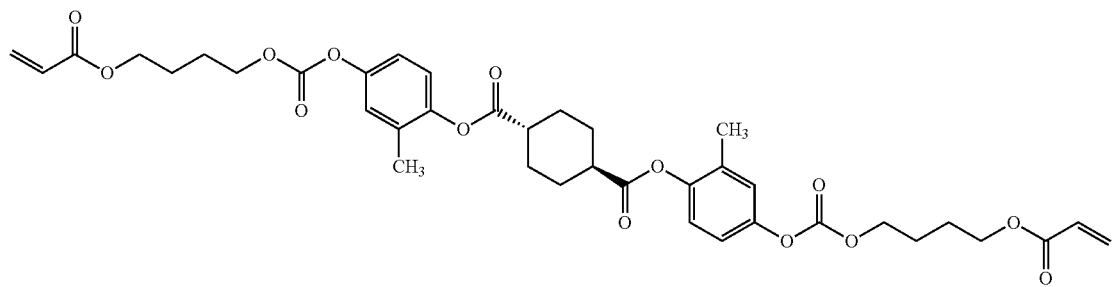
I-17
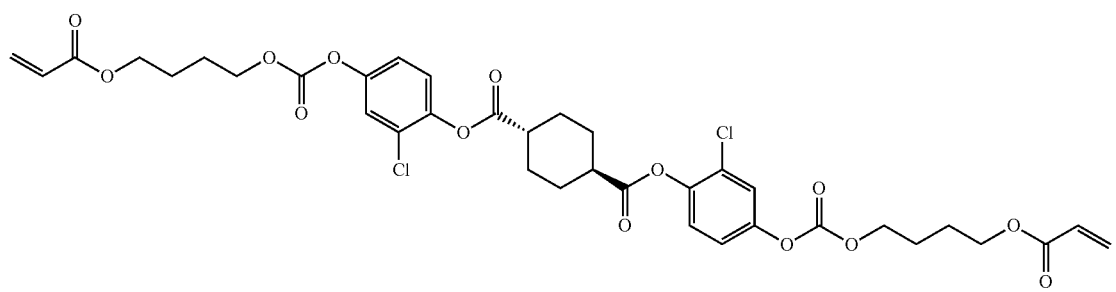
I-18
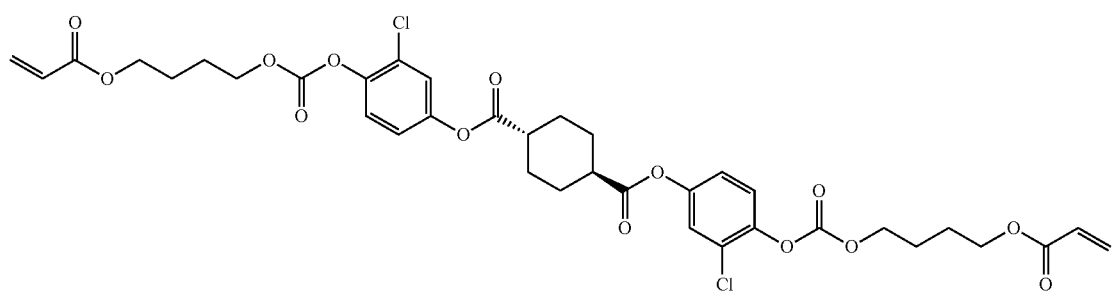
I-19
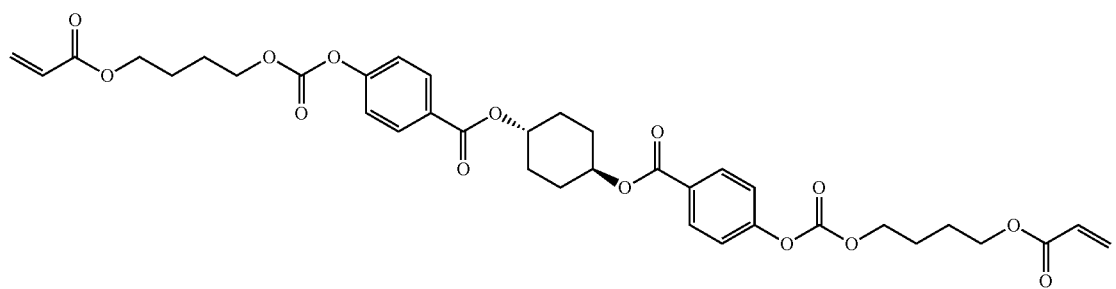

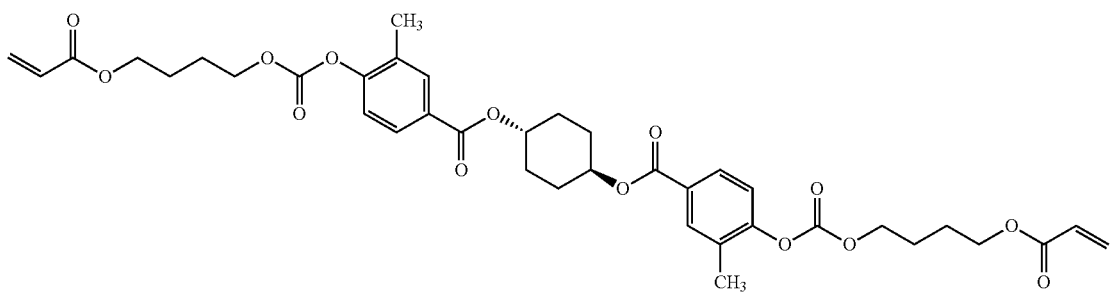

I-20

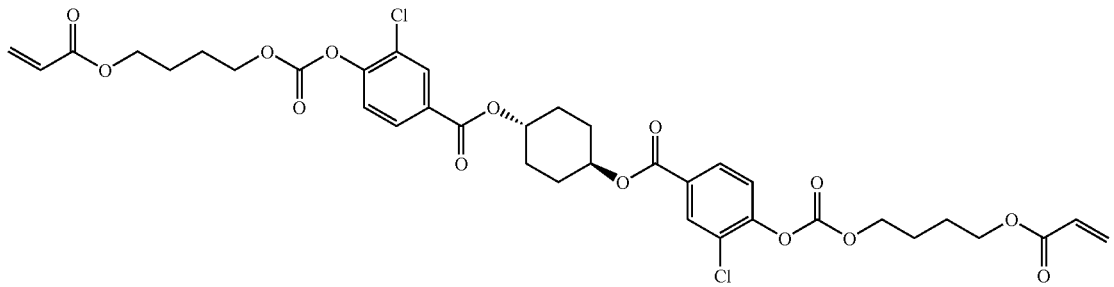

I-21

The optically anisotropic layer may be formed by using a discotic liquid crystal. The retardation layer is preferably a layer of polymer obtained by polymerization (curing) of a layer constituted of a low molecular weight liquid crystalline discotic compound such as monomer, or a polymerizable liquid crystalline discotic compound. Examples of the discotic (disc-like) compound include benzene derivatives described in a research paper of C. Destrade et al., Mol. Cryst. vol. 71, p 111 (1981), truxene derivatives described in research papers of C. Destrade et al., Mol. Cryst. vol. 122, p 141 (1985), Physicslett, A, vol. 78, p 82 (1990), cyclohexane derivatives described in a research paper of B. Kohne, et al., Angew. Chem. vol. 96, p 70 (1984), and azacrown-based and phenylacetylene-based macrocycles described in a research paper of J. M. Lehn et al., J. Chem. Commun., p 1794 (1985) and in a research paper of J. Zhang et al., J. Am. Chem. Soc. vol. 116, p 2655 (1994). The discotic (disc-like) compound generally has such construction that these molecules lie as a disk-like core mesogen at the molecule center, to which such groups (L) as linear alkyl groups or alkoxy groups, or substituted benzoyloxy groups are substituted radially. It shows liquid crystalline properties and includes compounds generally called discotic liquid crystal. When aggregates of such molecules align evenly, a negative optically uniaxial property is shown, but the instance is not limited to this description. Further, in the invention, "it has been formed from a disk-like compound" does not necessarily mean that the finally formed compound is the aforementioned compound. For example, when the aforementioned low molecular discotic liquid crystal has a group capable of reaction by heat, light etc., a compound, which is resulted from polymerization or crosslinking through the reaction by heat, light etc. to have a high molecular weight and lose liquid crystalline property, is also included.

According to the invention, the discotic liquid-crystalline compound represented by the formula (III) shown below are preferably used.

D(-L-P)$_n$            Formula (III)

In the formula, D is a discotic core; L represents a divalent liking group; P represents a polymerizable group; n is an integer ranging from 4 to 12.

Preferred examples of the discotic core (D), the divalent linking group (L) and the polymerizable group (P) are respectively (D1) to (D15), (L1) to (L25) and (P1) to (P18) described in JPA No. 2001-4837; and the descriptions regarding the discotic core (D), the divalent linking group (L) and the polymerizable group (P) may be preferably applicable to this embodiment.

Preferred examples of the discotic compound are shown below.

[Formula 6]

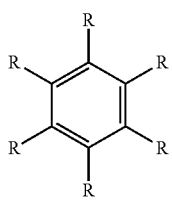

TE-1

(1) R: 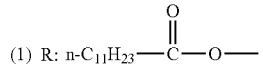

(2) 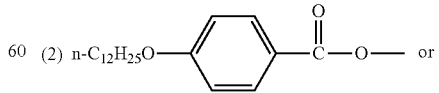 or (3) 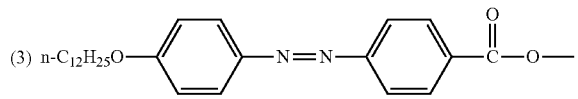

-continued
[Formula 7]
TE-2
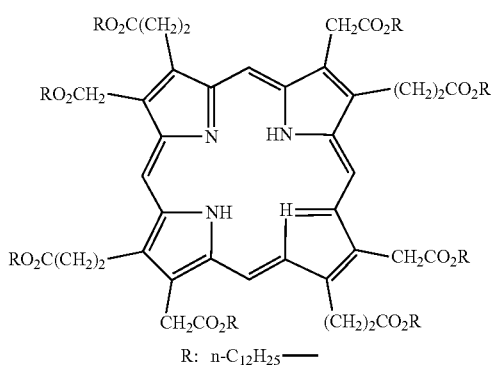
R: n-C$_{12}$H$_{25}$—
[Formula 8]
TE-3
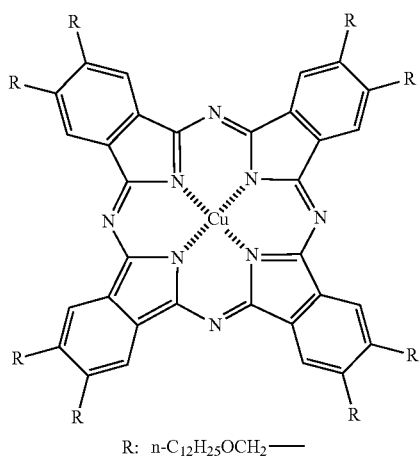
R: n-C$_{12}$H$_{25}$OCH$_2$—
[Formula 9]
TE-4
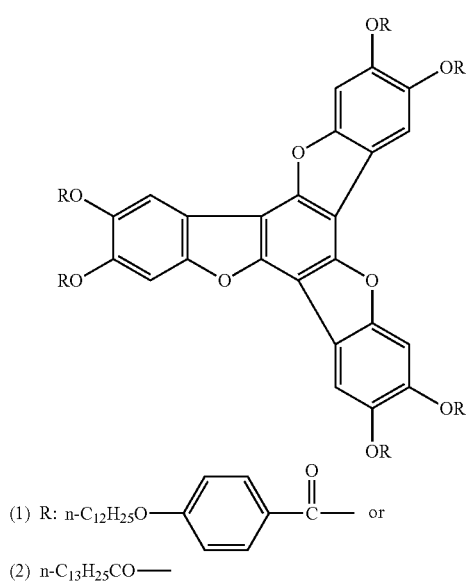
(1) R: n-C$_{12}$H$_{25}$O—⟨phenyl⟩—C(=O)— or
(2) n-C$_{13}$H$_{25}$CO—
[Formula 10]
TE-5
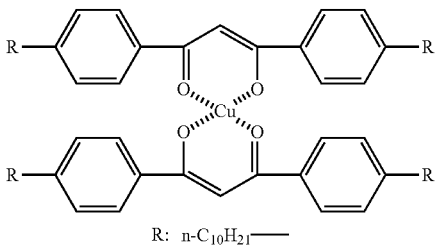
R: n-C$_{10}$H$_{21}$—
[Formula 11]
TE-6
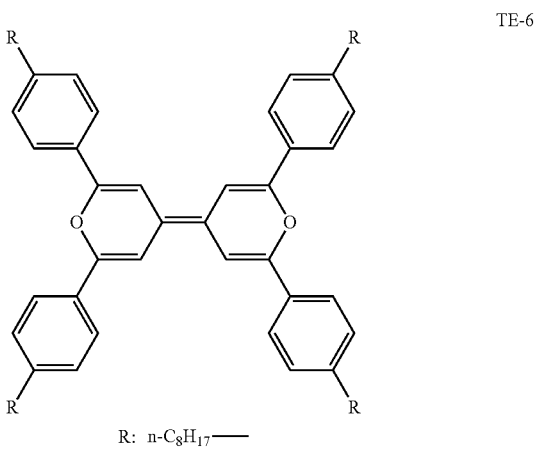
R: n-C$_8$H$_{17}$—
[Formula 12]
TE-7
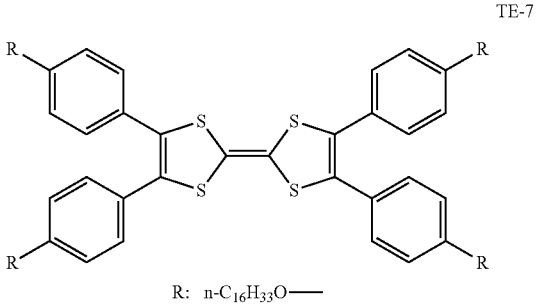
R: n-C$_{16}$H$_{33}$O—
[Formula 13]
TE-8
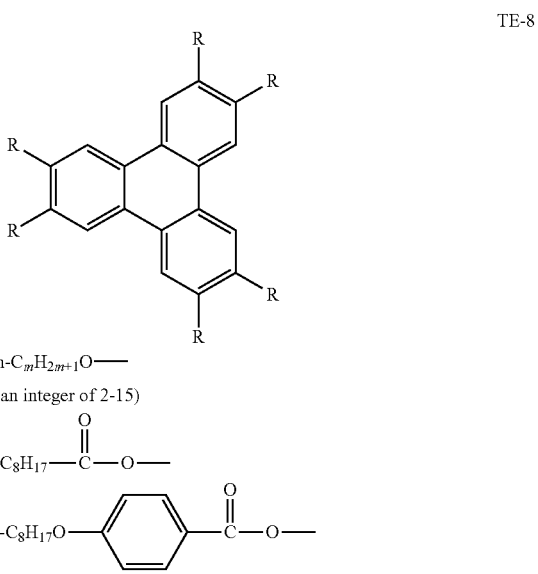
(1) n-C$_m$H$_{2m+1}$O—
(m = an integer of 2-15)
(2) n-C$_8$H$_{17}$—C(=O)—O—
(3) n-C$_8$H$_{17}$O—⟨phenyl⟩—C(=O)—O—

-continued (4) 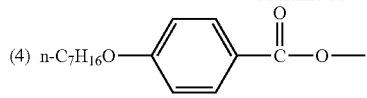

(5) 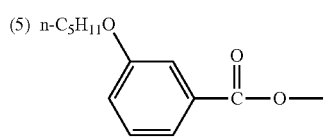

(6) 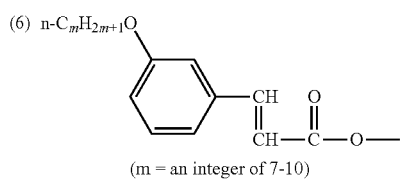

(m = an integer of 7-10)

(7) 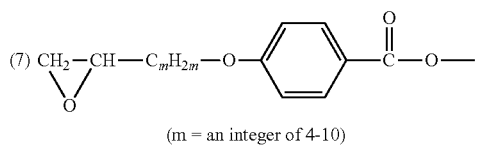

(m = an integer of 4-10)

(8) 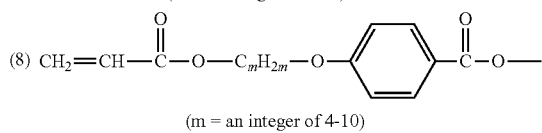

(m = an integer of 4-10)

[Formula 14]

TE-9

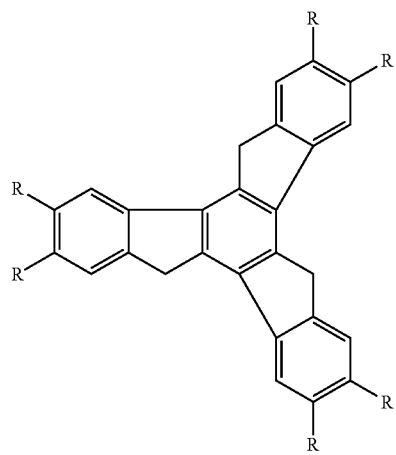

R:

(1) 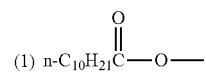

(2) 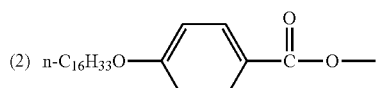

(3) 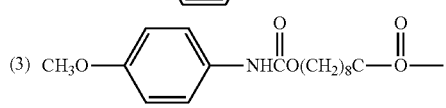

-continued

[Formula 15]

TE-10

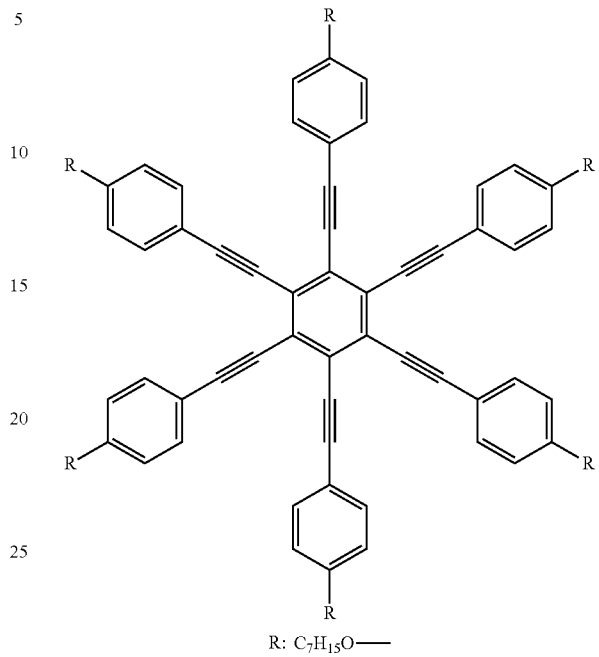

R: $C_7H_{15}O-$

[Formula 16]

TE-11

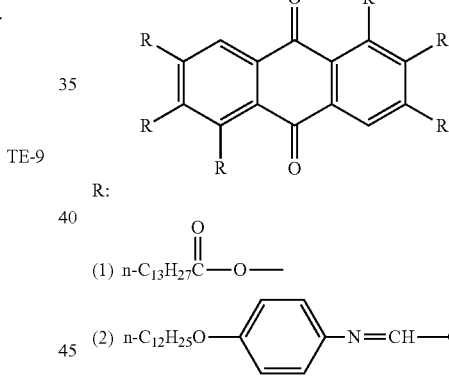

R:

(1) n-$C_{13}H_{27}\overset{O}{\underset{\parallel}{C}}-O-$ (2) n-$C_{12}H_{25}O-$⟨⟩$-N=CH-$⟨⟩$-\overset{O}{\underset{\parallel}{C}}-O-$ The aforementioned retardation layer is preferably a layer prepared by applying a fluid containing a liquid crystalline compound (for example, a solution of a liquid crystalline compound) to a surface of an alignment layer described later, aligning the same in an alignment state, and then stabilizing the aligned state by irradiation with heat or ionizing radiation. The optically anisotropic layer is preferably biaxial, because the VA-mode liquid crystal cell may optically be compensated in an accurate manner. When a rod-like liquid crystal compound having a reactive group is employed, for achieving biaxiality, it is necessary to deform a cholesteric alignment or a twisted hybrid-cholesteric alignment in which the tilt angle varies along the thickness direction by irradiating it with polarized light. Examples of the method for deforming the alignment by polarized-light irradiation include methods employing dichroic liquid-crystalline polymerization initiator, described in EP 1389199A1, and methods employing a rod-like liquid crystal compound(s) having a photo-induced alignment group such as cinnamoyl, described in JPA No. 2002-6138. According the invention, both methods may be used.

The optically anisotropic layer showing monoaxiality can optically compensate the VA-mode or IPS-mode liquid crystal cell in an accurate manner by optimizing optical anisotropy of the protective film of either one of the upper and lower polarizer plates. In either of VA mode and IPS mode, with respect to improvement in the color-viewing angle characteristics aimed at by the present invention, the liquid crystal cell may optically be compensated in an accurate manner by a general wavelength dispersion of retardation of the protective film for polarizer plate, characterized by smaller retardation under longer wavelength. The optically anisotropic layer used as the protective film for polarizer plate is preferably a c-plate for the VA mode, and is preferably biaxial showing minimum refractive index in the thickness-wise direction for the IPS mode. The monoaxial optically anisotropic layer used for the transfer material in the present invention may be produced by aligning monoaxial rod-like or discotic liquid crystalline compound so as to align the director of liquid crystal in a single direction. This sort of monoaxial alignment may be realized by a method of aligning a non-chiral liquid crystal layer on a rubbed alignment layer or on a photo-induced alignment layer, a method assisted by magnetic field or electric field, or a method of applying external force typically by stretching or shearing.

When the liquid crystalline compound used herein is a discotic liquid crystalline compound having a reactive group, it may be fixed in any state of alignment of horizontal alignment, vertical alignment, inclined alignment and twisted alignment, wherein horizontal alignment, vertical alignment and twisted alignment are preferable, and horizontal alignment is most preferable. The horizontal alignment herein means that the disk plane of the core of the discotic liquid crystalline compound is in parallel with the horizontal plane of the support, wherein alignment with an angle of inclination relative to the horizontal plane of smaller than 10° may be allowable in this specification, rather than calling for strict parallelness.

In any embodiments in which two or more optically anisotropic layers composed of liquid crystalline compounds are stacked, combination of the liquid crystalline compounds is not specifically limited, allowing stack of layers all composed of discotic liquid crystalline compound, stack of layers all composed of rod-like liquid crystalline compound, and stack of layer(s) composed of discotic liquid crystalline compound and layer(s) composed of rod-like liquid crystalline compound. Also combination of the state of alignment of the individual layers is not specifically limited, allowing stack of optically anisotropic layers having the same state of alignment, and stack of optically anisotropic layers having different states of alignment.

The retardation layer is preferably formed by applying a coating fluid containing a liquid crystalline compound, undermentioned polymerization initiator and other additives to a surface of an alignment layer described later. As the solvent for use in preparing the coating fluid, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone), and ethers (e.g., tetrahydrofuran, 1,2-dimethoxyethane). Alkyl halides and ketones are preferred. Two or more types of organic solvent may be used in a mixture.

[Stabilizing Alignment State of Liquid Crystal Composition]

After being aligned in a predetermined alignment state, the liquid crystal composition is preferably stabilized in the state. Stabilizing is preferably carried out by the polymerization reaction of the polymerizable groups contained in the liquid-crystalline molecules. Examples of the polymerization reaction include thermal polymerization reaction using a thermal polymerization initiator and photo-polymerization reaction using a photo-polymerization initiator. Photo-polymerization reaction is preferred. Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (JPA No. S 60-105667 and U.S. Pat. No. 4,239,850) and oxadiazole compounds (described in U.S. Pat. No. 4,212,970).

The amount of the photo-polymerization initiators to be used is preferably 0.01 to 20% by mass, more preferably 0.5 to 5% by mass on the basis of solids in the coating liquid. Irradiation for polymerizing the liquid-crystalline molecules preferably uses UV rays. The irradiation energy is preferably 20 mJ/cm$^2$ to 10 J/cm$^2$, and more preferably 100 to 800 mJ/cm$^2$. Irradiation may be carried out in a nitrogen gas atmosphere and/or under heating to accelerate the photo-polymerization reaction.

The optically anisotropic layer may be a layer having in-plane retardation attributed to photo-alignment induced by irradiation of polarized light. The irradiation of polarized light may be performed at the same time with photo polymerization step for stabilizing the alignment. Or irradiation of polarized light may be performed followed by stabilization by irradiation of non-polarized light, or stabilization by irradiation of non-polarized light may be performed followed by photo-alignment induced by irradiation of polarized light. The optically anisotropic layer having in-plane retardation attributed to photo-alignment induced by irradiation of polarized light is excellent for optical compensation, in particular, of VA-mode liquid crystal display device.

[Photo-Alignment Induced by Polarized Light Irradiation]

The optically anisotropic layer may be a layer having the in-plane retardation attributed to photo-alignment induced by irradiation of polarized light. In terms of obtaining large in-plane retardation, irradiation of polarized light should be carried out at first after the liquid crystal compound layer was formed by coating and aligned. Irradiation of polarized light is preferably carried out under an inert gas atmosphere having an oxygen concentration of 0.5% or less. Energy of irradiation is preferably adjusted to 20 mJ/cm$^2$ to 10 J/cm$^2$, and more preferably 100 to 800 mJ/cm$^2$. The illuminance is preferably 20 to 1000 mW/cm$^2$, more preferably 50 to 500 mW/cm$^2$, and still more preferably 100 to 350 mW/cm$^2$. Species of liquid crystalline compound curable by irradiation of polarized light is preferably a liquid crystalline compound having ethylenic unsaturated group as a reactive group, although not specifically limited. Wavelength of irradiation preferably has a peak in the range from 300 to 450 nm, and more preferably in the range from 350 to 400 nm.

[Post-Curing by Ultraviolet Irradiation after Irradiation of Polarized Light]

By further irradiation of polarized or non-polarized ultraviolet radiation after initial irradiation of polarized light (irradiation for photo-alignment), the reactivity of the reactive group (post-curing) may be improved so that the adhesiveness or the like may be improved and the optically anisotropic layer may be produced under larger conveying speed. The post-curing may be performed either by polarized light or non-polarized light, and the polarized light is more preferable. The post-curing may be preferably performed plural times, and it may be performed by irradiation of polarized light only, by irradiation of non-polarized light only, or by combination of irradiation of polarized light and non-polarized light. Employing such a combination, irradiation of polarized light may be preferably performed before irradiation of non-polarized light. The UV irradiation is preferably carried out under either atmosphere with or without replacement with an inert gas, wherein it is preferably carried out under an inert gas atmosphere having an oxygen concentration of 0.5% or lower. Energy of irradiation is preferably adjusted to the range from 20 mJ/cm$^2$ to 10 J/cm$^2$, and more preferably from 100 to 800 mJ/cm$^2$. The illuminance is preferably from 20 to 1000 mW/cm$^2$, more preferably 50 to 500 mW/cm$^2$, and still more preferably 100 to 350 mW/cm$^2$. Wavelength of irradiation preferably has a peak in the range from 300 to 450 nm for the case of irradiation of polarized light, and more preferably in the range from 350 to 400 nm. For the case of irradiation of non-polarized light, a peak preferably resides in the range from 200 to 450 nm, and more preferably in the range from 250 to 400 nm.

It is possible to align liquid-crystal compound horizontally by adding at least one compound represented by a formula (1), (2) or (3) shown below to the composition used for forming the optically anisotropic layer. It is to be noted that the term "horizontal alignment" means that, regarding rod-like liquid-crystalline molecules, the molecular long axes thereof and a layer plane are parallel to each other, and, regarding discotic liquid-crystalline molecules, the disk-planes of the cores thereof and a layer plane are parallel to each other. However, they are not required to be exactly parallel to each other, and, in the specification, the term "horizontal alignment" should be understood as an alignment state in which molecules are aligned with a tilt angle against a layer plane less than 10 degree. The tilt angle is preferably from 0 to 5 degree, more preferably 0 to 3 degree, still more preferably from 0 to 2 degree and most preferably from 0 to 1 degree.

The formula (1) to (3) will be described in detail below.

Formula (1)

[Formula 17]

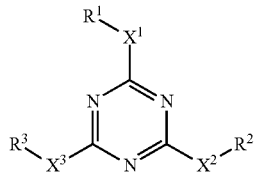

In the formula, $R^1$, $R^2$ and $R^3$ respectively represent a hydrogen atom or a substituent; and $X^1$, $X^2$ and $X^3$ respectively represent a single bond or a divalent linking group. Preferred examples of the substituent represented by $R^1$, $R^2$ or $R^3$ include substituted or non-substituted alkyls (preferably non-substituted alkyls or fluoro-substituted alkyls), substituted or non-substituted aryls (preferably aryls having at least one non-substituted alkyl or fluoro-substituted alkyl), substituted or non-substituted aminos, substitute or non-substituted alkoxys, substituted or non-substituted alkylthios and halogens. The $X^1$, $X^2$ and $X^3$ respectively represent a divalent linking group; preferably represent a divalent group selected from the group consisting of an alkylene, an alkenylene, a divalent aromatic group, a divalent cyclic group, —CO—, —NR$^a$— (R$^a$ represents a $C_{1-5}$ alkyl or a hydrogen atom), —O—, —S—, —SO—, —SO$_2$— and combinations thereof; and more preferably represent a divalent linking group selected from the group consisting of an alkylene, phenylene, —CO—, —NR$^a$—, —O—, —S— and —SO$_2$— and any combinations thereof. The number of carbon atoms of the alkylene preferably ranges from 1 to 12. The number of carbon atoms of the alkenylene preferably ranges from 2 to 12. The number of carbon atoms of the divalent aromatic group preferably ranges from 6 to 10.

Formula (2)

[Formula 18]

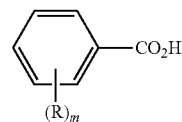

In the formula, R represents a substituent, m is an integer from 0 to 5. When m is 2 or more, plural R may be same or different each other. Preferred examples of the substituent represented by R are same as those exemplified as examples of $R^1$, $R^2$ or $R^3$. In the formula (2), m preferably represents an integer ranging from 1 to 3, and is more preferably 2 or 3.

Formula (3)

[Formula 19]

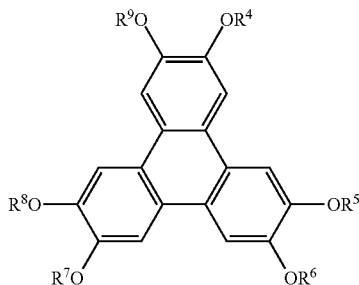

In the formula, $R^4$, $R^5$, $R^6$, $R^7$, $R^8$ and $R^9$ respectively represent a hydrogen atom or a substituent. Preferred examples of the substituent represented by $R^4$, $R^5$, $R^6$, $R^7$, $R^8$ and $R^9$ are same as those exemplified as examples of $R^1$, $R^2$ or $R^3$ in the formula (I). Examples of the horizontal alignment agent, which can be used in the present invention, include those described in JPA No. 2005-099248, paragraphs [0092]-[0096], and the methods for preparing such compounds are described in the document.

The amount of the compound represented by the formula (1), (2) or (3) is preferably from 0.01 to 20 mass %, more preferably from 0.01 to 10 mass % and much more preferably from 0.02 to 1 mass %. One type compound may be selected from the formula (1), (2) or (3) and used singly, or two or more type of compounds may be selected from the formula (1), (2) or (3) and used in combination.

[Alignment Layer]

As described above, an alignment layer may be utilized in order to form the optically anisotropic layer. The alignment layer is generally provided on a transparent substrate or a undercoating layer on the transparent substrate. The alignment layer functions so as to define the alignment direction of a liquid crystalline compound that is provided thereon. Any layer may be used as an alignment layer provided that it can give the alignment property to the optically anisotropic layer. Examples of the preferable alignment layer include a layer of an organic compound (preferably polymer) having been subjected to rubbing treatment, an oblique evaporation layer of an inorganic compound, a layer prepared by irradiating with a polarized light or obliquely irradiating with a natural light to a compound capable of photoisomerization and a layer having micro grooves, further, an accumulated film of ω-tricosanoic acid, dioctadecylmethylammonium chloride or methyl stearate formed by a Langmuir-Blodgett method (LB film), and layers formed by aligning dielectric materials by applying an electric field or magnetic field.

Examples of the organic compound for the alignment layer include polymers such as polymethyl methacrylate, acrylic acid/methacrylic acid copolymer, styrene/maleinimide copolymer, polyvinyl alcohol, poly(N-methylol acrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonate, and compounds such as a silane coupling agent. Examples of preferable polymers include polyimide, polystyrene, polymers of styrene derivatives, gelatin, polyvinyl alcohol and alkyl-modified polyvinyl alcohol having an alkyl group (preferably having six or more carbon atoms).

Polymer is preferably used for forming an alignment layer. The type of polymer that is utilizable can be determined in accordance with the alignment (particularly an average tilt angle) of a liquid crystalline compound. For example, in order to align horizontally the liquid crystalline compound, a polymer that does not lower the surface energy of the alignment layer (ordinary polymer for alignment) is used. As to specific types of polymers, there are descriptions in various documents about a liquid crystal cell or an optical compensatory sheet. For example, polyvinyl alcohol or modified polyvinyl alcohol, copolymer with polyacrylic acid or polyacrylic acid ester, polyvinyl pyrrolidone, cellulose or modified cellulose are preferably used. Raw materials for the alignment layer may have a functional group capable of reacting with a reactive group of a liquid crystalline compound. The reactive group can be introduced by introducing a repeating unit having a reactive group in a side chain, or as a substituent of a cyclic group. The use of an alignment layer that forms a chemical bond with a liquid crystalline compound at the interface is more preferred. Such alignment layer is described in JPA NO. H9-152509, and modified polyvinyl alcohol to which an acrylic group is introduced in a side chain thereof using acid chloride or Karenz MOI (manufactured by SHOWA DENKO K. K.) is particularly preferred. The thickness of the alignment layer is preferably from 0.01 to 5 μm, further preferably from 0.05 to 2 μm. The alignment layer may have a function as an oxygen-insulation film.

In addition, a polyimide (preferably a fluorine atom-containing polyimide) film widely used as the alignment layer of LCD is also preferred as an organic alignment layer. This can be obtained by coating polyamic acid (such as LQ/LX series manufactured by Hitachi Chemical Co., Ltd., or SE series manufactured by NISSAN CHEMICAL INDUSTRIES, LTD.) on the substrate surface, burning the same at 100 to 300° C. for 0.5 to 1 hour, and then rubbing the same.

As to the rubbing treatment, a treatment method which is widely adopted as a step of aligning liquid crystal in an LCD can be utilized. That is, a method, in which the surface of the alignment layer is rubbed with paper, gauze, felt, rubber, nylon or polyester fiber in a predetermined direction to attain alignment, can be used. In general, it is practiced by carrying out the rubbing around several times using a cloth obtained by grafting uniformly fibers having a uniform length and thickness.

As a vapor deposition material for an inorganic oblique vapor deposition film, SiO is a representative example, and metal oxides such as $TiO_2$ and $ZnO_2$, fluorides such as $MgF_2$, and further metals such as Au and Al can be mentioned. Incidentally, any metal oxides may be used as an oblique vapor deposition material provided that it has a high permittivity, and they are not limited to those described above. An inorganic oblique vapor deposition film can be formed by using a vapor deposition apparatus. By carrying out vapor deposition while fixing a film (substrate), or carrying out vapor deposition continuously while moving a long film, an inorganic oblique vapor deposition film can be formed.

A liquid crystal compound may be aligned on a temporary alignment layer and stabilized in the alignment state to form an optically anisotropic layer, and may be transferred onto a transparent support typically using an adhesive from the temporary alignment layer; the optically anisotropic layer may be formed directly, without the transferring step, which is preferable in terms of productivity. Examples of the method of forming the optically anisotropic layer onto the temporary support employable herein include various methods such as coating, printing, ink jet, and film transfer. More specifically, the methods below may be employable.

Coating Manner:

The optically anisotropic layer is formed on the necessary pigments, by spreading a coating fluid comprising a composition for forming optically anisotropic layer according to any coating manner such as spin coater, slit coater, gravure coater, curtain coater or the like on the substrate, aligning the composition, and exposing the coated layer with an arbitrary pattern and developing it. The process may be followed by annealing for thorough stabilizing, if necessary. The above-described procedures may be repeated several times, so as to form, on the substrate, the optically anisotropic layer having a plurality of properties.

Printing Manner:

Any known printing technique, including intaglio printing, letterpress printing, screen printing and planographic printing, may be adoptable to formation of the optically anisotropic layer on the substrate. The process may be followed by annealing for thorough stabilizing, if necessary. The above-described procedures may be repeated several times, so as to form, on the substrate, the optically anisotropic layer having a plurality of properties.

Ink Jet Manner:

The optically anisotropic layer is formed on the substrate, by jetting an ink composition from any jet head. The process may be followed by annealing for thorough stabilizing, if necessary. The above-described procedures may be repeated several times, so as to form, on the substrate, the optically anisotropic layer having a plurality of properties.

Film Transfer Manner:

The necessary optically anisotropic layer is formed on the substrate, by transferring the optically anisotropic layer onto the substrate using a transfer sheet having a composition for forming optically anisotropic layer preliminarily coated on the support, followed by exposing the layer with an arbitrary pattern and developing it. The process may be followed by annealing for thorough stabilizing, if necessary. The above-described procedures may be repeated several times, so as to form, on the substrate, the optically anisotropic layer having a plurality of properties.

In any cases described in the above, the optically anisotropic layer may be provided on the aforementioned alignment film.

Of the various methods described in the above, the film transfer process is particularly preferable in terms of simplicity of the processes and flatness.

[Temporary Support]

The temporary support, which can be used in the transfer material of the present invention, may be selected various materials such as any transparent or opaque materials since it is removed from the optically anisotropic layer after transferring it onto the transparent substrate. Examples of the polymer constituting the temporary substrate include cellulose ester such as cellulose acetate, cellulose propionate, cellulose butyrate; polyolefin such as norbornene based polymer, poly (meth)acrylates such as polymethylmethacrylate, polycarbonates, polyesters and polysulfones and norbornene based polymers. In terms of checking properties during producing process, the transparent support is preferably selected from transparent and low-birefringence polymer materials; and in terms of low-birefringence, cellulose esters and norbornene based polymers are preferable. Commercially available polymers (for example, as a norbornene based polymer, "ARTON" provided by JSR and "ZEONEX" and "ZEONOR" provided by ZEON CORPORATION) may be employed. And low-cost polycarbonates and polyethylene terephthalates may be also preferably used.

[Thermoplastic Polymer Layer]

The transfer material may comprise a thermoplastic polymer layer. Examples of the ingredient to be used for preparing the thermoplastic polymer layer include polymer substances disclosed in Japanese Published Patent Application No. Hei 5-72724. The ingredient is particularly preferably selected from organic polymer substances having softening points, measured by the Vicat method (more specifically, a method of measuring softening point of polymer conforming to ASTMD1235 authorized by American Society For Testing and Materials) of approximately 80° C. or below. More specifically, organic polymers such as polyolefins including polyethylene and polypropylene; ethylene copolymers including those composed of ethylene and vinyl acetate or saponified product thereof, or composed of ethylene and acrylate ester or saponified product thereof; polyvinyl chloride; vinyl chloride copolymers including those composed of vinyl chloride and vinyl acetate or saponified product thereof; polyvinylidene chloride; vinylidene chloride copolymer; polystyrene; styrene copolymers including those composed of styrene and (meth)acrylate ester or saponified product thereof; polyvinyl toluene; vinyltoluene copolymers such as being composed of vinyl toluene and (meth)acrylate ester or saponified product thereof; poly(meth)acrylate ester; (meth) acrylate ester copolymers including those composed of butyl (meth)acrylate and vinyl acetate; vinyl acetate copolymers; and polyamide polymers including nylon, copolymerized nylon, N-alkoxymethylated nylon and N-dimethylamino-substituted nylon.

According to the transfer material, it is preferable to provide an intermediate layer for the purpose of preventing mixing of the components during coating of a plurality of layers and during storage after the coating. The oxygen insulation film having oxygen insulation function described as a "separation layer" in Japanese Published Patent Application No. Hei 5-72724 is preferably used, since sensitivity during the light exposure increases, exposure time is decreased, and the productivity is improved. Any films showing a low oxygen permeability and being dispersible and soluble to water or aqueous alkaline solution are preferably used as the oxygen insulation film, and such films can properly be selected from any known films. Of these, particularly preferable is a combination of polyvinyl alcohol and polyvinyl pyrrolidone.

The thermoplastic polymer layer or the intermediate layer may work as an alignment layer. Polyvinyl alcohols and polyvinyl pyrrolidones which can be used preferable for the intermediate layer are also preferable for an alignment layer; and a single layer working as an intermediate layer and an alignment layer is preferable.

On the polymer layer such as the optically anisotropic layer, it is preferable to provide a thin protective film for the purpose of preventing contamination or damage during storage. The protective film may be composed of a material same as, or similar to, that used for the temporary support, but must be readily separable from the polymer layer. Preferable examples of the material composing the protective film include silicon paper, polyolefin sheet and polytetrafluoroethylene sheet.

The individual layers of the optically anisotropic layer, and optionally-formed alignment layer, thermoplastic polymer layer, and intermediate layer can be formed by coating such as dip coating, air knife coating, curtain coating, roller coating, wire bar coating, gravure coating and extrusion coating (U.S. Pat. No. 2,681,294). Two or more layers may be simultaneously by coating. Examples of the method of simultaneous coating include those described in U.S. Pat. Nos. 2,761,791, 2,941,898, 3,508,947, 3,526,528, and in "Kotingu Kogaku (Coating Engineering), written by Yuji Harazaki, p. 253, published by Asakura Shoten (1973).

EXAMPLES

The present invention will more specifically be explained, referring to Examples. Any materials, reagents, mass of substances and their ratios, operations and so forth shown in Example below may appropriately be altered, without departing from the spirit of the present invention. Therefore, the scope of the present invention will never be limited by the specific examples below.

(Preparation of Coating Liquid AL-1 for Forming Alignment Layer)

The composition below was prepared, filtered through a polypropylene filter with a pore size of 30 μm, and was used as a coating liquid AL-1 for forming alignment layer.

| Formulation of Coating Liquid for Forming Alignment Layer (%) | |
|---|---|
| Polyvinyl alcohol (PVA205, from Kuraray Co., Ltd.) | 3.21 |
| Polyvinyl pyrrolidone (Luvitec K30, from BASF) | 1.48 |
| Distilled water | 52.1 |
| Methanol | 43.21 |

(Preparation of Coating Liquid LC-1 for Forming Optically Anisotropic Layer)

The composition below was prepared, filtered through a polypropylene filter with a pore size of 0.2 μm, and was used as a coating liquid LC-1 for forming optically anisotropic layer.

LC-1-1 was synthesized according to the method described in Tetrahedron Lett., Vol. 43, p. 6793 (2002). LC-1-2 was synthesized according to the method described in EP1388538A1, page 21.

| Formulation of Coating Liquid for Forming Optically Anisotropic Layer (%) | |
| --- | --- |
| Rod-like liquid crystal (Paliocolor LC242, from BASF Japan) | 28.6 |
| Chiral agent (Paliocolor LC756, from BASF Japan) | 3.40 |
| 4,4'-Azoxyanisole | 0.52 |
| Styrene boronic acid | 0.02 |
| Agent for Horizontal alignment (LC-1-1) | 0.10 |
| Photo-polymerization initiator (LC-1-2) | 1.36 |
| Methyl ethyl ketone | 66.0 |

[Formula 20]

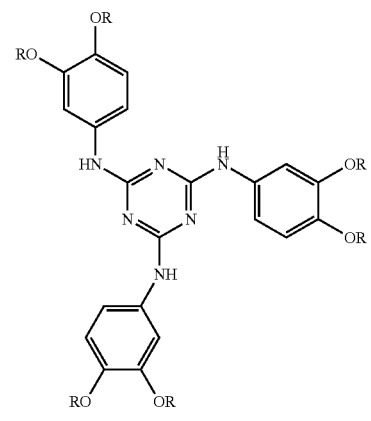

R = $CH_2CH_2OCH_2CH_2C_6F_{13}$ (LC-1-1)

Formulation of Coating Liquid for Forming Optically Anisotropic Layer (%)

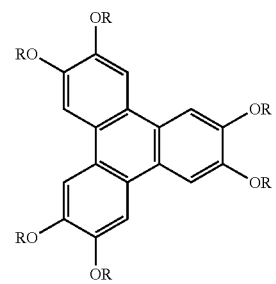

(LC-2-2)

(Preparation of Coating Liquid LC-2 for Forming Optically Anisotropic Layer)

The composition below was prepared, filtered through a polypropylene filter with a pore size of 0.2 μm, and was used as a coating liquid LC-2 for forming optically anisotropic layer. LC-2-1 was synthesized according to the method described in Japanese Published Patent Application No. 2001-166147. LC-2-2 was synthesized by dissolving a commercially-available hydroxyethyl methacrylate, acrylic acid and M5610 (from Daikin Industries, Ltd.) at a ratio on the weight basis of 15/5/80 in methyl ethyl ketone (40% concentration), and by allowing the mixture to polymerize using V-601 (from Wako Pure Chemical Industries, Ltd.) as a polymerization initiator. LC-2-3 was prepared as follows. First, octyloxybenzoic acid (from Kanto Chemical Co., Ltd.) was introduced into an excessive amount of hydroquinone (from Wako Pure Chemical Industries, Ltd.) by the mixed acid anhydride method, to thereby obtain a monoacylphenol compound. Next, methyl p-hydroxybenzoate was hydroxyethylated using ethylene carbonate, the resultant ester was hydrolyzed, and further brominated using hydrobromic acid, to thereby synthesize 2-bromoethyloxybenzoic acid. Two these compounds were subjected to esterification based on the mixed acid anhydride method to produce a diester compound, and the product was quaternarized using dimethylaminopyridine, to thereby synthesize LC-2-3 as an onium salt.

| Formulation of Coating Liquid for Forming Optically Anisotropic Layer (% by mass) | |
| --- | --- |
| Discotic liquid crystalline compound (LC-2-1) | 30.0 |
| Ethylene oxide-modified trimethylolpropane triacrylate (V#360, from Osaka Organic Chemical Industry, Ltd.) | 3.3 |
| Photo-polymerization initiator (Irgacure 907, from Ciba Specialty Chemicals, Inc.) | 1.0 |
| Sensitizer (Kayacure DETX, from Nippon Kayaku Co., Ltd.) | 0.33 |
| Agent for Vertical alignment at air-interface side (LC-2-2) | 0.12 |
| Agent for Vertical alignment at alignment layer side (LC-2-3) | 0.15 |
| Methyl ethyl ketone | 65.1 |

[Formula 21]

Formulation of Coating Liquid for Forming Optically Anisotropic Layer (% by mass)

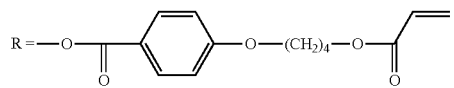

(LC-2-1)

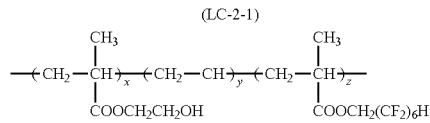

x/y/z = 15/05/80 Mw = 19000

(LC-2-2)

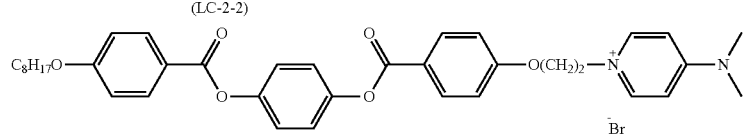

(LC-2-3)

(Preparation of Coating Liquid CU-1 for Forming Thermoplastic Resin Layer)

The composition below was prepared, filtered through a polypropylene filter with a pore size of 30 μm, and was used as a coating liquid CU-1 for forming alignment layer.

| Formulation of Coating Liquid for Forming Thermoplastic Resin Layer (%) | |
|---|---|
| Methyl methacrylate/2-ethylhexyl acrylate/benzyl methacrylate/methacrylic acid copolymer (compositional ratio of copolymer (molar ratio) = 55/30/10/5, weight-average molecular weight = 100,000, Tg ≈ 70° C.) | 5.89 |
| Styrene/acrylic acid copolymer (compositional ratio of copolymer (molar ratio) = 65/35, weight-average molecular weight = 10,000, Tg ≈ 100° C.) | 13.74 |
| BPE-500 (from Shin-Nakamura Chemical Co., Ltd.) | 9.20 |
| Megafac F-780-F (from DIC Corporation) | 0.55 |
| Methanol | 11.22 |
| Propylene glycol monomethyl ether acetate | 6.43 |
| Methyl ethyl ketone | 52.97 |

(Preparation of Coating Liquid AL-1 for Forming Intermediate Layer/Alignment Layer)

The composition below was prepared, filtered through a polypropyrene filter with a pore size of 30 μm, and was used as a coating liquid AL-1 for forming intermediate layer/alignment layer.

| Formulation of Coating Liquid for Forming Intermediate Layer/Alignment Layer (%) | |
|---|---|
| Polyvinyl alcohol (PVA205, from Kuraray Co., Ltd.) | 3.21 |
| Polyvinyl pyrrolidone (Luvitec K30, from BASF) | 1.48 |
| Distilled water | 52.1 |
| Methanol | 43.21 |

Methods of preparing coating liquids for forming photosensitive resin layer will be explained. Table 1 shows Formulations of the individual coating liquids for the forming photosensitive resin layer.

TABLE 1

| (% by mass) | PP-K1 | PP-R1 | PP-G1 | PP-B1 |
|---|---|---|---|---|
| K Pigment dispersion | 25 | — | — | — |
| R Pigment dispersion −1 | — | 44 | — | — |
| R Pigment dispersion −2 | — | 5.0 | — | — |
| G Pigment dispersion | — | — | 24 | — |
| CF YellowEX3393 (from Mikuni Color, Ltd.) | — | — | 13 | — |
| CF BlueEX3357 (from Mikuni Color, Ltd.) | — | — | — | 7.2 |
| CF BlueEX3383 (from Mikuni Color, Ltd.) | — | — | — | 13 |
| Propylene glycol monomethyl ether acetate (PGMEA) | 8.0 | 7.6 | 29 | 23 |
| Methyl ethyl ketone | 53.494 | 37.412 | 25.115 | 35.78 |
| Cyclohexanone | — | — | 1.3 | — |
| Binder 1 | 9.1 | — | 3.0 | — |
| Binder 2 | — | 0.8 | — | — |
| Binder 3 | — | — | — | 17 |
| DPHA Solution | 4.2 | 4.4 | 4.3 | 3.8 |
| 2-Trichloromethyl-5-(p-styrylmethyl)-1,3,4-Oxadiazole | — | 0.14 | 0.15 | 0.15 |
| 2,4-Bis(trichloromethyl)-6-[4-(N,N-diethoxycarbonylmethyl)-3-bromophenyl]-s-triazine | 0.160 | 0.058 | 0.060 | — |
| Phenothiazine | — | 0.010 | 0.005 | 0.020 |
| Hydroquinone monomethyl ether | 0.002 | — | — | — |
| HIPLAAD ED152 (from Kusumoto Chemicals, Ltd.) | — | 0.52 | — | — |
| Megafac F-176PF (from DIC Corporation) | 0.044 | 0.060 | 0.070 | 0.050 |

Ingredients listed in Table 1 are as follow.

[Formulation of K Pigment Dispersion]

| Formulation of K Pigment Dispersion (%) | |
|---|---|
| Carbon black (Special Black 250 from Degussa) | 13.1 |
| 5-[3-Oxo-2-[4-[3,5-bis(3-diethylaminopropyl-aminocarbonyl)phenyl]aminocarbonyl]phenylazo]-butyloylamino benzimidazolone | 0.65 |

-continued

| Formulation of K Pigment Dispersion (%) | |
|---|---|
| Random copolymer of benzyl methacrylate/methacrylic acid = 72/28 (molar ratio) (weight-average molecular weight = 37,000) | 6.72 |
| Propylene glycol monomethyl ether acetate | 79.53 |

[Formulation of R Pigment Dispersion-1]

| Formulation of R Pigment Dispersion-1 (%) | |
|---|---|
| C.I. Pigment Red 254 | 8.0 |
| 5-[3-Oxo-2-[4-[3,5-bis(3-diethylaminopropyl-aminocarbonyl)phenyl]aminocarbonyl]phenylazo]-butyloylamino benzimidazolone | 0.8 |
| Random copolymer of benzyl methacrylate/methacrylic acid = 72/28 (molar ratio) (weight-average molecular weight = 37,000) | 8.0 |
| propylene glycol monomethyl ether acetate | 83.2 |

[Formulation of R Pigment Dispersion-2]

| Formulation of R Pigment Dispersion-2 (%) | |
|---|---|
| C.I. Pigment Red 177 | 18.0 |
| Random copolymer of benzyl methacrylate/methacrylic acid = 72/28 (molar ratio) (weight-average molecular weight = 37,000) | 12.0 |
| Propylene glycol monomethyl ether acetate | 70.0 |

[Formulation of G Pigment Dispersion]

| Formulation of G Pigment Dispersion (%) | |
|---|---|
| C.I. Pigment Green 36 | 18.0 |
| Random copolymer of benzyl methacrylate/methacrylic acid = 72/28 (molar ratio) (weight-average molecular weight = 37,000) | 12.0 |
| Cyclohexanone | 35.0 |
| Propylene glycol monomethyl ether acetate | 35.0 |

[Formulation of Binder 1]

| Formulation of Binder 1 (%) | |
|---|---|
| Random copolymer of benzyl methacrylate/methacrylic acid = 78/22 (molar ratio) (weight-average molecular weight = 40,000) | 27.0 |
| Propylene glycol monomethyl ether acetate | 73.0 |

[Formulation of Binder 2]

| Formulation of Binder 2 (%) | |
|---|---|
| Random copolymer of benzyl methacrylate/methacrylic acid/methyl methacrylate = 38/25/37 (molar ratio) (weight-average molecular weight = 30,000) | 27.0 |
| Propylene glycol monomethyl ether acetate | 73.0 |

[Formulation of Binder 3]

| Formulation of Binder 3 (%) | |
|---|---|
| Random copolymer of benzyl methacrylate/methacrylic acid/methyl methacrylate = 36/22/42 (molar ratio) (weight-average molecular weight = 30,000) | 27.0 |
| Propylene glycol monomethyl ether acetate | 73.0 |

[Formulation of DPHA Solution]

| Formulation of DPHA Solution(%) | |
|---|---|
| Kayarad DPHA (from Nippon Kayaku Co., Ltd.) | 76.0 |
| Propylene glycol monomethyl ether acetate | 24.0 |

(Preparation of Coating Liquid PP-K1 for Forming Photosensitive Resin Layer)

Coating liquid PP-K1 for forming photosensitive resin layer was obtained as follows. First, predetermined amounts, as listed in Table 1, of K pigment dispersion and propylene glycol monomethyl ether acetate were weighed, mixed at 24° C. (±2° C.), and stirred mixture at 150 rpm for 10 minutes. Predetermined amounts, as listed in Table 1, of methyl ethyl ketone, binder 1, hydroquinone monomethyl ether, DPHA solution 2,4-bis(trichloromethyl)-6-[4-(N,N-diethoxycarbonylmethyl)-3-bromophenyl]-s-triazine and Megafac F-176 PF were weighed, added them in this order to the mixture at 25° C. (±2° C.), and stirred at 40° C. (±2° C.), 150 rpm for 30 minutes.

(Preparation of Coating Liquid PP-R1 for Forming Photosensitive Resin Layer)

Coating liquid PP-R1 for forming photosensitive resin layer was obtained as follows. Predetermined amounts, as listed in Table 1, of R pigment dispersion-1, R pigment dispersion-2 and propylene glycol monomethyl ether acetate were weighed, mixed at 24° C. (±2° C.), and stirred at 150 rpm for 10 minutes. Predetermined amounts, as listed in Table 1, of methyl ethyl ketone, binder 2, DPHA solution, 2-trichloromethyl-5-(p-styrylmethyl)-1,3,4-oxadiazole, 2,4-bis(trichloromethyl)-6-[4-(N,N-diethoxy carbonylmethyl)-3-bromophenyl]-s-triazine and phenothiazine were weighed, added in this order to the mixture at 24° C. (±2° C.), and stirred at 150 rpm for 10 minutes. Then predetermined amount, as listed in Table 1, of ED152 was weighed, mixed at 24° C. (±2° C.) to the mixture, and stirred at 150 rpm for 20 minutes. Further, predetermined amount, as listed in Table 1, of Megafac F-176 PF was weighed, added to the mixture at 24° C. (±2° C.), stirred at 30 rpm for 30 minutes, and filtered through a nylon mesh #200.

(Preparation of Coating Liquid PP-G1 for Forming Photosensitive Resin Layer)

Coating liquid PP-G1 for forming photosensitive resin layer was obtained as follows. Predetermined amounts, as listed in Table 1, of G pigment dispersion, CF Yellow EX3393 and propylene glycol monomethyl ether acetate were weighed, mixed at 24° C. (±2° C.), and stirred at 150 rpm for 10 minutes. Then predetermined amounts, as listed in Table 1, of methyl ethyl ketone, cyclohexanone, binder 1, DPHA solution, 2,4-bis(trichloromethyl)-6-[4-(N,N-diethoxy carbonylmethyl)-3-bromophenyl]-s-triazine and phenothiazin were weighed, added in this order to the mixture at 24° C. (±2° C.), and stirred at 150 rpm for 30 minutes. Further predetermined amount, as listed in Table 1, of Megafac F-176 PF was weighed, added to the mixture at 24° C. (±2° C.), stirred at 30 rpm for 5 minutes, and filtered through a nylon mesh #200.
(Preparation of Coating Liquid PP-B1 for Forming Photosensitive Resin Layer)

Coating liquid PP-B1 for forming photosensitive resin layer was obtained as follows. First, predetermined amounts, as listed in Table 1, of CF Blue EX3357, CF Blue EX3383 and propylene glycol monomethyl ether acetate were weighed, mixed at 24° C. (±2° C.), and stirred at 150 rpm for 10 minutes. Then predetermined amounts, as listed in Table 1, of methyl ethyl ketone, binder 3, DPHA solution, 2-trichloromethyl-5-(p-styrylmethyl)-1,3,4-oxadiazole and phenothiazine were weighed, added in this order to the mixture at 25° C. (±2° C.), and stirred at 40° C. (±2° C.) at 150 rpm for 30 minutes. Further predetermined amount, as listed in Table 1, of Megafac F-176 PF was weighed, added to the mixture at 24° C. (±2° C.), stirred at 30 rpm for 5 minutes, and filtered through a nylon mesh #200.
(Formation of Color Filter 1)

Color filter 1 was formed according to the method described below.

-Formation of Black (K) Image-

A non-alkali glass substrate was cleaned by showering, for 20 seconds, a glass cleaner solution conditioned at 25° C. using a rotating nylon-yarn brush, cleaned by showering pure water, showered with silane coupling solution (0.3% aqueous solution of N-β(aminoethyl)-γ-aminopropyl trimethoxysilane, trade name KBM-603 from Shin-Etsu Chemical Co., Ltd.) for 20 seconds, and then cleaned by showering pure water. The substrate was heated using a substrate preheater at 100° C. for 2 minutes.

The above-described photosensitive coating liquids PP-K1, PP-R1, PP-G1 and PP-B1 were respectively coated using a spin coater on the glass substrate, dried at 100° C. for 2 minutes, exposed to light independently according to a predetermined mask pattern at energy of PP-K1: 200 mJ/cm$^2$, PP-R1: 100 mJ/cm$^2$, PP-G1: 100 mJ/cm$^2$ and PP-B1: 100 mJ/cm$^2$, developed using a 1% aqueous KOH solution, and annealed at 240° C. for one hour, to thereby form a black matrix, and a color filter 1 composed of R layer (2.5 μm thick), G layer (2.0 μm thick) and B layer (1.5 μm thick).
(Formation of Color Filter 2)

The transfer materials described below, for forming color filter, were respectively produced.
(Preparation of Photosensitive Resin Transfer material for Forming Black Matrix)

On a rolled temporary support composed of a polyethylene terephthalate film of 75 μm thick, the coating liquid CU-1 for forming thermoplastic resin layer was coated through a slit-like nozzle, and dried. Next, the coating liquid AL-1 for forming intermediate layer/alignment layer was coated and dried. The coating liquid PP-K1 for forming photosensitive resin layer is further coated, dried, to thereby form, on the temporary support, a thermoplastic resin layer of 14.6 μm dried-thickness, an intermediate layer of 1.6 μm dried-thickness, and a photosensitive resin layer of 2.4 μm dried-thickness, and a protective film (12-μm-thickness polypropylene film) was pressure-bonded to the laminate. In this way, a photosensitive resin transfer material K-1 for forming black matrix, having the temporary support, the thermoplastic resin layer, the intermediate layer (oxygen blocking film) and the black (K) photosensitive resin layer integrated therein, was produced.

(Preparation of Photosensitive Resin Transfer Material for Forming RGB Layers)

On a rolled temporary support composed of a polyethylene terephthalate film of 75 μm thick, the coating liquid CU-1 for forming thermoplastic resin layer was coated through a slit-like nozzle, and dried. Next, the coating liquid AL-1 for forming alignment layer was coated and dried. The thermoplastic resin layer was found to be 14.6 μm thickness, and the alignment layer was found to be 1.6 μm thickness. Lastly, the coating liquid PP-R1 for forming photosensitive resin layer was coated, and dried so as to form a red-colored photosensitive resin layer of 2.7 μm thickness, to thereby produce a photosensitive resin transfer material R-1 for forming R layer, as Example 2 of the present invention.

Also photosensitive resin transfer materials G-1, B-1 for forming G and B layers were similarly produced except that the coating liquids PP-G1 and PP-B1 were used in place of PP-R1. A green-colored photosensitive resin layer of the transfer material G-1 was found to be 2.2 μm thickness, and a blue-colored photosensitive resin layer of the transfer material B-1 was found to be 1.7 μm thickness.

Next, a color filter 2 was produced using thus-produced transfer materials.

-Formation of Black (K) Image-

A non-alkali glass substrate was cleaned by showering, for 20 seconds, a glass cleaner solution conditioned at 25° C. using a rotating nylon-yarn brush, cleaned by showering pure water, showered with silane coupling solution (0.3% aqueous solution of N-β(aminoethyl)-γ-aminopropyl trimethoxysilane, trade name KBM-603 from Shin-Etsu Chemical Co., Ltd.) for 20 seconds, and then cleaned by showering pure water. The substrate was heated using a substrate preheater at 100° C. for 2 minutes.

The transfer material of Example 1 was laminated, using a laminater (Lamic Model II, from Hitachi Plant Technologies, Ltd.), onto the substrate preheated at 100° C. for 2 minutes, under a rubber roller temperature of 130° C., a line pressure of 100 N/cm, and a feed speed of 2.2 m/min, the protective film was peeled off, the entire surface of the product was irradiated with light of a super-high-pressure mercury lamp at an energy of exposure of 50 mJ/cm$^2$, the product was developed using TPD, TCD and TSD developing solutions from FUJIFILM Corporation, and baked at 240° C. for 2 hours so as to sequentially form a black matrix, R pixels, G pixels and B pixels, on the glass substrate, to thereby form a color filter 2 composed of R layer (2.5 um thickness), G layer (2.0 μm thickness) and B layer (1.5 μm thickness).
(Preparation of Color Filter 3)

Respectively using the coating liquids similar to the photosensitive coating liquids PP-R1, PP-G1 and PP-B1, except that the photopolymerization initiator was removed therefrom, an RGB pattern was formed by intaglio printing on a non-alkali glass, and annealed at 240° C. for 2 hours, to thereby form a color filter 3 composed of R layer (2.5 μm thickness), G layer (2.0 μm thickness) and B layer (1.5 μm thickness) on the glass substrate.
(Preparation of Color Filter 4)

The black matrix is preliminarily formed on the substrate according to the method of coating described in the above, an RGB pattern was then formed by the ink jet process, respectively using the coating liquids similar to the photosensitive coating liquids PP-R1, PP-G1 and PP-B1, except that the photopolymerization initiator was removed therefrom, and annealed at 240° C. for 2 hours, to thereby form a color filter 4 composed of R layer (2.5 μm thickness), G layer (2.0 μm thickness) and B layer (1.5 μm thickness) on the glass substrate.

(Polarized UV Irradiation Apparatus POLUV-1)

A polarized UV irradiation apparatus was configured using a UV irradiation apparatus (Light Hammer 10, 240 W/cm, from Fusion UV Systems) based on the microwave-induced emission system, adopting, as a UV light source, a D-bulb showing an intense emission spectral peak in the range from 350 to 400 nm, and a wire-grid polarizing filter (ProFlux PPL02, high transmissivity type, from Moxtek Inc.) disposed 3 cm away from the surface to be irradiated. Maximum illuminance of the apparatus was 400 mW/cm$^2$.

(Preparation of Transfer Material 1 for Forming Optically Anisotropic Layer)

On a rolled temporary support composed of a polyethylene terephthalate film of 75 μm thickness, the coating liquid AL-1 for forming alignment layer was coated through a slit-like nozzle, and dried. The thickness was found to be 1.6 μm. Next, thus-formed alignment layer was rubbed, the coating liquid LC-1 for forming optically anisotropic layer was coated thereon using a #6 wire bar coater, and the coated film was dried and aged by heating at a film surface temperature of 95° C. for 2 minutes, to thereby form a layer showing a uniform liquid crystal phase.

Immediately after the ageing, the layer was irradiated by polarized UV radiation using POLUV-1 (illuminance=200 mW/cm$^2$, energy of irradiation=200 mJ/cm$^2$), while aligning the transmission axis of the polarizer plate to the transverse direction (TD) of the transparent support, under a nitrogen atmosphere having an oxygen concentration of 0.3% or less, so as to fix the optically anisotropic layer, to thereby form an optically anisotropic layer of 2.75 μm thickness.

(Preparation of Transfer Material 2 for Forming Optically Anisotropic Layer)

On a rolled temporary support composed of a polyethylene terephthalate film of 75 μm thickness, the coating liquid CU-1 for forming thermoplastic resin layer was coated through a slit-like nozzle, and dried. The thickness was found to be 1.6 μm. Next, the coating liquid AL-1 for forming alignment layer was coated and dried. The thermoplastic resin layer was found to be 1.5 μm thickness, and the alignment layer was found to be 1.6 μm thickness. Thus-formed alignment layer was rubbed, the coating liquid LC-1 for forming optically anisotropic layer was coated thereon using a #6 wire bar coated, and the coated film was dried and aged by heating at a film surface temperature of 95° C. for 2 minutes, to thereby form a layer showing a uniform liquid crystal phase. The layer was further aged, and immediately thereafter, the layer was irradiated by polarized UV radiation using POLUV-1 (illuminance=200 mW/cm$^2$, energy of irradiation=200 mJ/cm$^2$), while aligning the transmission axis of the polarizer plate to the transverse direction (TD) of the transparent support, under a nitrogen atmosphere having an oxygen concentration of 0.3% or less, so as to fix the optically anisotropic layer, to thereby form an optically anisotropic layer of 2.75 μm thickness.

(Preparation of Transfer Material 3 for Forming Optically Anisotropic Layer)

The transfer material 3 for forming optically anisotropic layer was produced similarly to the transfer material 1 for forming optically anisotropic layer, except that the coating liquid LC-2 for forming optically anisotropic layer was coated using a #3.4 wire bar coater, the coated film was dried and aged by heating at 125° C. for 3 minutes, to thereby form a layer showing a uniform liquid crystal phase, and then irradiated in the air with UV radiation using a 160-W/cm, air-cooled metal halide lamp (from Eyegraphics Co., Ltd.) at an illuminance of 400 mW/cm$^2$, and an energy of irradiation of 300 mJ/cm$^2$, so as to fix the optically anisotropic layer, to thereby form an optically anisotropic layer of 1.6 μm thickness.

(Measurement of Retardation)

Front retardation Re(0), and retardation values Re(40) and Re(−40), observed by inclining the samples by ±40° assuming the slow axis as the axis of rotation, were measured according to the parallel Nicol method using a fiber spectrometer at an arbitrary wavelength λ, which was selected at 545 nm herein. The retardation values measured herein were corrected using preliminarily-measured data of transmissivity of the underlying layers, and were consequently given as values ascribable solely to the optically anisotropic layer. Results of measurement of retardation values of the transfer materials 1, 2 and 3 for forming the optically anisotropic layer are shown in Table 2.

TABLE 2

| Sample | Re | Re(40) | Re(−40) |
|---|---|---|---|
| Transfer material 1 for forming optically anisotropic layer | 33.0 | 67.1 | 67.3 |
| Transfer material 2 for forming optically anisotropic layer | 33.2 | 67.3 | 67.1 |
| Transfer material 3 for forming optically anisotropic layer | 130.0 | 119.8 | 119.2 |

Examples 1 to 3

Each of the transfer materials 1 to 3 was respectively laminated using a laminator (Lamic Model II, from Hitachi Plant Technologies, Ltd.) onto the substrate having the color filter 1 formed thereon, preheated at 100° C. for 2 minutes, under a rubber roller temperature of 130° C., a line pressure of 100 N/cm, and a feed speed of 2.2 m/min, and the temporary support and the alignment film were peeled off, to thereby provide an optically anisotropic layer on the color filter. The optically anisotropic layer had different thicknesses depending on the different thicknesses among the RGB pixels of the color filter, and thicknesses on R, G and B were 3.15 μm, 2.75 μm and 2.15 μm respectively. The retardation values Re (40) and Re (−40) of the optically anisotropic regions disposed on RGB pixels were as follow.

Values of wavelength λ adopted to measurement of retardation for the individual colors were 611 nm for R, 545 nm for G, and 435 nm for B.

| Sample | | Re | Re(40) | Re(−40) |
|---|---|---|---|---|
| Example 1 | on R | 19.1 | 50.3 | 50.4 |
| | on G | 33.6 | 67.3 | 67.8 |
| | on B | 48.2 | 86.4 | 86.1 |
| Example 2 | on R | 19.3 | 50.5 | 50.4 |
| | on G | 33.8 | 67.5 | 67.8 |
| | on B | 48.0 | 86.3 | 86.2 |
| Example 3 | on R | 100.5 | 83.0 | 81.4 |
| | on G | 130.0 | 119.8 | 119.2 |
| | on B | 150.0 | 130.8 | 129.2 |

On thus-completed color filter provided with the optically anisotropic layer, an ITO film of 2,000 Å was formed thereon by sputtering, and further thereon a polyimide alignment film was provided. Thereafter, spacers capable of keeping the liquid crystal layer to as thick as 5 μm, were formed by photolithographic process on the black matrix. Next, a sealing material composed of an epoxy resin containing spacer particles was applied by printing to the region corresponded to the outer frame of the black matrix provided around the pixel group of the color filter, and the color filter substrate was bonded to the opposed substrate (glass substrate having a TFT layer provided thereto) under a pressure of 10 kg/cm. Next, thus-bonded glass substrates were annealed at 150° C. for 90 minutes, so as to allow the sealing material to cure, to thereby obtain a stack of two glass substrates. The stack of glass substrate was degassed in vacuo, and then the atmospheric pressure was recovered so as to allow a liquid crystal to be sucked up into a gap between two glass substrates, to thereby obtain a liquid crystal cell. On both surfaces of the liquid crystal cell, polarizer plates HLC2-2518 from Sanritz Corporation were bonded.

As a cold-cathode-ray-tube back light for color liquid crystal display device, a white three-wavelength fluorescent lamp adjusted to express an arbitrary hue, using a phosphor composed of a 50:50 mixture, on the weight basis, of $BaMg_2Al_{16}O_{27}$:Eu, Mn and $LaPO_4$:Ce, Tb for green color (G), $Y_2O_3$:Eu for red color (R), and $BaMgAl_{10}O_{17}$:Eu for blue color (B), was produced. On the back light, the liquid crystal cell attached with the above-described polarizer plates was placed, to thereby manufacture a VA-LCD.

(Evaluation of VA-LCD)

Thus-produced liquid crystal display device was observed in the black state (without applied voltage), in particular with respect to leakage of light at the corners, initially by visual observation under a room temperature condition, and again observed after allowed to stand under thermostat and hygrostat conditions of 40° C. and 90% RH for 48 hours. Results are shown in Table 3.

TABLE 3

| Sample | Result of Visual Observation |
| --- | --- |
| Example 1 | Black state display remained almost unchanged, without showing distinct leakage of light at the corners. |

(Evaluation of VA-LCD)

Viewing angle characteristics of thus-produced liquid crystal display device were measured using a viewing angle measuring instrument (EZ Contrast 160D, from ELDIM). Changes in color, when the LCD was viewed while varying viewing angle rightward, 45° upper-rightward, and 0 to 80° upwardly from the normal line direction, in the black state (without applied voltage), were visually evaluated. Results are shown in Table 4.

TABLE 4

| Sample | Result of Visual Observation |
| --- | --- |
| Example 1 | Desirable contrast-viewing angle characteristics, with minimum noticeable color shift in the black state. |

Examples 4 to 6

An optically anisotropic layer was provided on the color filter similarly to as described in Example 1, except that the substrate having the color filter 2 formed thereon was used. The optically anisotropic layer had different thicknesses depending on the different thicknesses among the RGB pixels of the color filter, and thicknesses on R, G and B were 3.15 μm, 2.75 μm and 2.15 μm respectively.

The retardation values Re(40) and Re(−40) of the optically anisotropic regions disposed on RGB pixels were as follow.

Values of wavelength λ adopted to measurement of retardation for the individual colors were 611 nm for R, 545 nm for G, and 435 nm for B.

| Sample | | Re | Re(40) | Re(−40) |
| --- | --- | --- | --- | --- |
| Example 4 | on R | 19.2 | 50.2 | 50.4 |
| | on G | 33.5 | 67.2 | 67.9 |
| | on B | 48.1 | 86.5 | 86.3 |
| Example 5 | on R | 19.3 | 50.7 | 50.4 |
| | on G | 33.6 | 67.8 | 67.5 |
| | on B | 48.3 | 86.3 | 86.2 |
| Example 6 | on R | 100.2 | 83.3 | 82.4 |
| | on G | 130.6 | 119.5 | 119.8 |
| | on B | 150.5 | 130.5 | 129.8 |

Evaluation of VA-LCD produced similarly to as described in Example 1 showed that the black state was kept almost unchanged, without showing noticeable leakage of light at the corners. Also the contrast-viewing angle characteristics were desirable, showing only an almost unnoticeable level of color shift in the black state.

Examples 7 to 9

An optically anisotropic layer was provided on the color filter similarly to as described in Example 1, except that the substrate having the color filter 3 formed thereon was used. The optically anisotropic layer had different thicknesses depending on the different thicknesses among the RGB pixels of the color filter, and thicknesses on R, G and B were 3.15 μm, 2.75 μm and 2.15 μm respectively. The retardation values Re(40) and Re(−40) of the optically anisotropic regions disposed on RGB pixels were as follow.

Values of wavelength λ adopted to measurement of retardation for the individual colors were 611 nm for R, 545 nm for G, and 435 nm for B.

| Sample | | Re | Re(40) | Re(−40) |
| --- | --- | --- | --- | --- |
| Example 7 | on R | 19.4 | 50.5 | 50.2 |
| | on G | 33.5 | 67.4 | 67.7 |
| | on B | 48.4 | 86.5 | 86.3 |
| Example 8 | on R | 19.2 | 50.5 | 50.2 |
| | on G | 33.7 | 67.5 | 67.8 |
| | on B | 48.1 | 86.4 | 86.1 |
| Example 9 | on R | 100.3 | 83.2 | 81.9 |
| | on G | 130.9 | 119.1 | 119.2 |
| | on B | 150.1 | 130.0 | 129.6 |

Evaluation of VA-LCD produced similarly to as described in Example 1 showed that the black state was kept almost unchanged, without showing noticeable leakage of light at the corners. Also the contrast-viewing angle characteristics were desirable, showing only an almost unnoticeable level of color shift in the black state.

Examples 10 to 12

An optically anisotropic layer was provided on the color filter similarly to as described in Example 1, except that the substrate having the color filter 4 formed thereon was used. The optically anisotropic layer had different thicknesses depending on the different thicknesses among the RGB pixels of the color filter, and thicknesses on R, G and B were 3.15

μm, 2.75 μm and 2.15 μm respectively. The retardation values Re(40) and Re(−40) of the optically anisotropic regions disposed on RGB pixels were as follow.

Values of wavelength λ adopted to measurement of retardation for the individual colors were 611 nm for R, 545 nm for G, and 435 nm for B.

| Sample | | Re | Re(40) | Re(−40) |
|---|---|---|---|---|
| Example 10 | on R | 19.1 | 50.3 | 50.4 |
| | on G | 33.6 | 67.3 | 67.8 |
| | on B | 48.2 | 86.4 | 86.1 |
| Example 11 | on R | 19.3 | 50.5 | 50.4 |
| | on G | 33.8 | 67.5 | 67.8 |
| | on B | 48.0 | 86.3 | 86.2 |
| Example 12 | on R | 100.5 | 83.0 | 81.4 |
| | on G | 130.0 | 119.8 | 119.2 |
| | on B | 150.0 | 130.8 | 129.2 |

Evaluation of VA-LCD produced similarly to as described in Example 1 showed that the black state was kept almost unchanged, without showing noticeable leakage of light at the corners. Also the contrast-viewing angle characteristics were desirable, showing only an almost unnoticeable level of color shift in the black state.

Comparative Example 1

VA-LCD was produced similarly to as described in Example 1, except that the optically anisotropic layer was not provided in Example 1. The VA-LCD evaluated similarly to as described in Example 1 revealed that the black state was kept almost unchanged over the entire surface, but only a slight leakage of light was observed at the corners of the display. The contrast-viewing angle characteristics were found to be almost equivalent to those in Example 1, but coloration was observed in the oblique views, proving lower definition of display.

Figure 1:
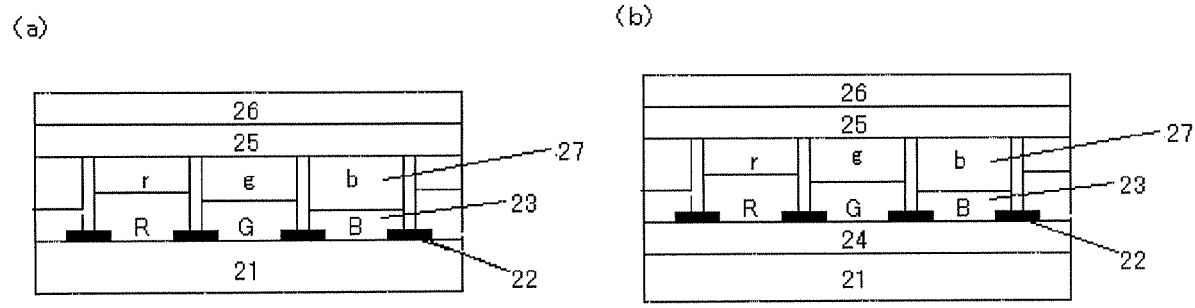
FIG. 1 These are schematic sectional views of exemplary liquid crystal cell substrates of the present invention.
Figure 2:
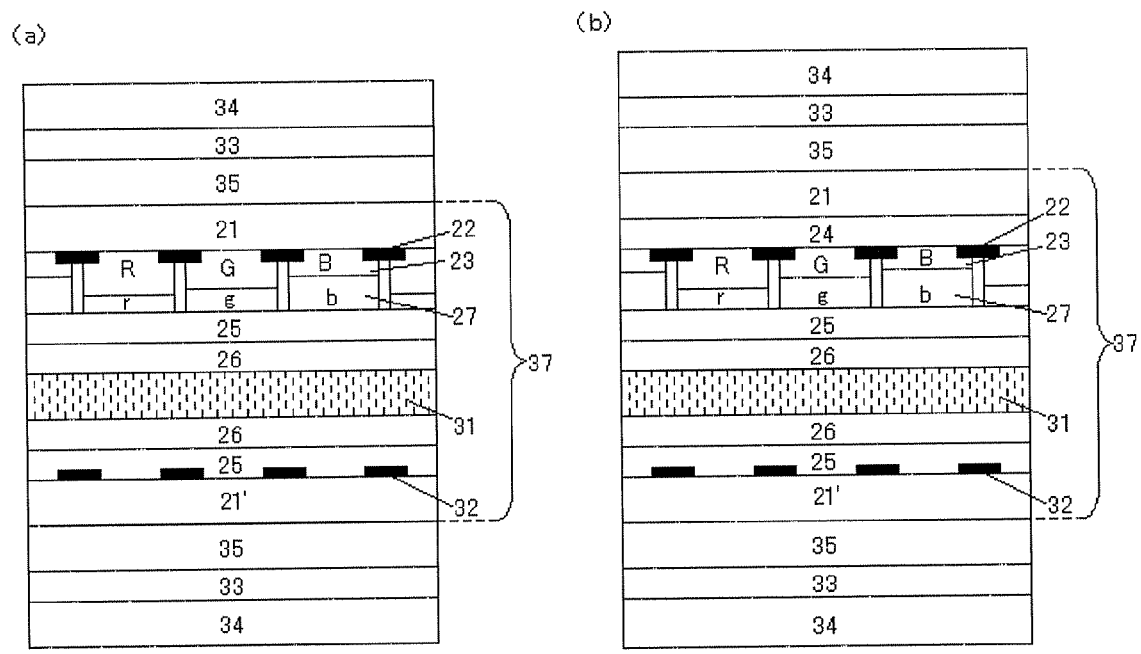
FIG. 2 These are schematic sectional views of exemplary liquid crystal display devices of the present invention.
Figure 3:
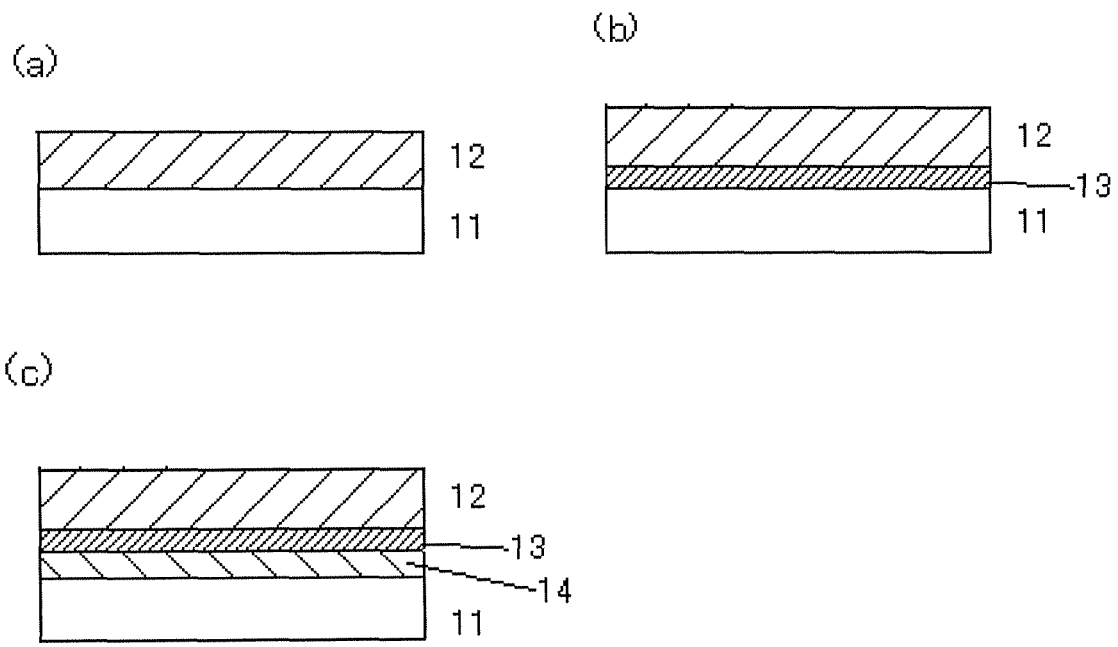
FIG. 3 These are schematic sectional views of exemplary transfer materials adoptable to the method of producing of the present invention.

EXPLANATION OF THE MARKS 11 temporary support
12 optically anisotropic layer
13 photosensitive resin layer
14 mechanical characteristics control layer
15 alignment control layer
16 protective layer
21 transparent substrate (substrate to be transferred)
21' transparent substrate
22 black matrix
23 colored layer (color filter)
24 optically anisotropic layer
25 transparent electrode layer
26 alignment layer
27 optically anisotropic layer
31 liquid crystal
32 TFT layer
33 polarizer layer R
34 cellulose acetate film (polarizer plate protective film)
35 cellulose acetate film, or optical compensation sheet
36 polarizer plate
37 liquid crystal cell

The invention claimed is:

1. A method of producing a liquid crystal cell substrate comprising:
   (1) forming an image having at least two different hues and having different thicknesses for the respective hue domains on a substrate, and
   (2) forming at least one monoaxial or biaxial optically anisotropic layer having different film thicknesses on the respective hue domains of the image,
   wherein said optically anisotropic layer is a layer formed by irradiating a composition comprising a liquid crystalline compound having at least one reactive group with heat or radiation after the composition begins to show a cholesteric phase.

2. The method of claim 1, further comprising, following said step (2),
   (3) irradiating said optically anisotropic layer with light.

3. The method of claim 2, further comprising, following said step (3),
   (4) removing a part of said optically anisotropic layer on said substrate.

4. The method of claim 1, wherein said step (2) is a step of transferring said optically anisotropic layer onto the image from a transfer material.

5. The method of claim 1, wherein said radiation is polarized ultraviolet radiation.

6. The method of claim 1, wherein said reactive group is an ethylenic unsaturated group.

7. The method of claim 1, wherein said liquid crystalline compound is a rod-like liquid crystal compound.

8. The method of claim 1, wherein said liquid crystalline compound is a discotic liquid crystalline compound.

9. The method of claim 1, wherein said optically anisotropic layer has a value of front retardation (Re) of not 0, and has the same values of retardation measured for light of λ nm coming to the optically anisotropic layer along the direction +40° inclined relative to the normal line direction assuming the in-plane slow axis as the axis of inclination (axis of rotation), and of retardation measured for light of λ nm coming to the optically anisotropic layer along the direction −40° inclined relative to the normal line direction assuming the in-plane slow axis as the axis of inclination (axis of rotation).

10. The method of claim 1, wherein said optically anisotropic layer has a value of front retardation (Re) of 20 to 200 nm, and has a value of retardation, measured for light coming to the optically anisotropic layer along the direction +40° inclined relative to the normal line direction assuming the in-plane slow axis as the axis of inclination (axis of rotation), of 50 to 250 nm.

11. A liquid crystal cell substrate comprising;
   a substrate;
   a colored layer, on said substrate, having at least two different hues and having different thicknesses for the respective hue domains; and
   at least one monoaxial or biaxial optically anisotropic layer, on said colored layer, having different film thicknesses depending on hues of the respective hue domains thereunder,
   wherein said optically anisotropic layer is a layer formed by irradiating a composition comprising a liquid crystalline compound having at least one reactive group with heat or radiation after the composition begins to show a cholesteric phase.

12. The liquid crystal cell substrate of claim 11, wherein said optically anisotropic layer formed on said colored layer has a horizontal surface.

13. A liquid crystal cell substrate produced by a method as set forth in claim 1.

14. A liquid crystal display device comprising a liquid crystal cell comprising a pair of substrates, and a liquid crystal layer held between said pair of substrates, wherein one of said pair of substrates is the liquid crystal cell substrate as set forth in claim 11.

15. The liquid crystal display device of claim 14, employing any one of TN mode, VA mode and IPS mode.

* * * * *